United States Patent
Ushio et al.

(10) Patent No.: US 6,489,624 B1
(45) Date of Patent: *Dec. 3, 2002

(54) APPARATUS AND METHODS FOR DETECTING THICKNESS OF A PATTERNED LAYER

(75) Inventors: Yoshijiro Ushio, Yokohama; Takehiko Ueda, Tokyo-to; Eiji Matsukawa, Yotsukaidou; Motoo Koyama, Tokyo, all of (JP)

(73) Assignee: Nikon Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,162

(22) Filed: Jul. 20, 1998

(30) Foreign Application Priority Data

| Jul. 18, 1997 | (JP) | 9-193995 |
| Aug. 12, 1997 | (JP) | 9-217768 |
| Oct. 2, 1997 | (JP) | 9-287860 |
| Oct. 30, 1997 | (JP) | 9-312898 |

(51) Int. Cl.[7] ............................................... G01N 21/86
(52) U.S. Cl. ............................ 250/559.27; 250/559.19; 438/16; 451/6
(58) Field of Search .................. 250/559.19, 559.27, 250/559.22, 559.4; 356/381, 382, 72, 630; 216/60; 438/16, 14; 451/6

(56) References Cited

U.S. PATENT DOCUMENTS

| 4,141,780 A | * 2/1979 | Kleinknecht et al. ......... 117/85 |
| 4,408,884 A | * 10/1983 | Kleinknecht et al. ........ 356/355 |
| 5,555,474 A | * 9/1996 | Ledger ......................... 356/381 |
| 5,674,652 A | * 10/1997 | Bishop et al. ................. 430/30 |
| 5,717,490 A | * 2/1998 | Kumar ......................... 356/381 |
| 5,724,144 A | * 3/1998 | Muller et al. ................ 356/382 |
| 5,964,643 A | * 10/1999 | Birang et al. ................... 451/6 |
| 5,982,496 A | * 11/1999 | Ziger ........................... 356/381 |
| 6,045,433 A | * 4/2000 | Dvir et al. ....................... 451/6 |

FOREIGN PATENT DOCUMENTS

| JP | 63-050703 | 3/1988 |
| JP | 6-252113 | 9/1994 |
| JP | 7-052032 | 2/1995 |
| WO | WO95/18353 | 7/1995 |

* cited by examiner

Primary Examiner—Que T. Le
Assistant Examiner—Thanh X. Luu
(74) Attorney, Agent, or Firm—Klarquist Sparkman, LLP

(57) ABSTRACT

Apparatus and methods are disclosed that measure the thickness of a layer on a workpiece such as a semiconductor wafer, especially as the layer is undergoing a process such as polishing to achieve planarization of the layer. The apparatus comprises a probe light optical system that directs a beam of probe light to be incident on a surface of the layer, and produce a signal light from reflection of the probe light from or transmission of the probe light through the layer. A light detector retrieves and detects sufficient wavelengths of the signal light to produce a corresponding electronic signal encoding data regarding the intensity at various wavelengths of the signal light. At least one of the following is monitored: appearance or disappearance of maxima or minima in a spectrum of intensity or transmittance of the signal light, a change in wavelength at which a maximum or minimum is located in the spectrum, and change in intensity at a particular wavelength at which a maximum or minimum is located in the spectrum. The apparatus can be included with a polishing apparatus.

32 Claims, 16 Drawing Sheets

APPARATUS AND METHODS FOR DETECTING THICKNESS OF A PATTERNED LAYER

FIELD OF THE INVENTION

This invention pertains to apparatus and methods for polishing a workpiece such as a semiconductor wafer on which one or more thin patterned layers have been applied. More specifically, the invention pertains to such apparatus and methods that monitor, during polishing or other process step that imposes a time-varying change in thickness of such a patterned layer, the extent of thickness change imparted to the layer to determine whether a desired endpoint has been reached. The invention also pertains to apparatus and methods that measure layer and film thicknesses, especially the thickness of a layer or film on the surface of a workpiece having multiple thin-film layers, and minute surface irregularities of such films.

BACKGROUND OF THE INVENTION

Semiconductor devices continue to be developed with no apparent upper limit on the feature density of such devices. Many obstacles associated with higher feature densities have been overcome using various technologies and methods.

One significant lingering problem has been achieving, during fabrication of the semiconductor device, satisfactory planarization of wafer surfaces having comparatively large area. As the integration density of devices has increased, the wavelength used for microlithography has tended to decrease with a concomitant need to form various features in different layers in the thickness dimension of the device. Reducing the wavelength of light used for microlithography tends to lead to a reduced depth of focus of the projection-optical system used for microlithography. Hence, there is an increasing demand for more precise planarization of wafer workpieces, at least over the exposure area of the wafer, between sequential microlithography steps. Also, as greater demands are made of so-called "inlays" (i.e., implantation of metal electrode layers, plugs, or damascene in the thickness dimension), the need to remove excess metal and achieve planarization after forming each layer is increased.

With improvements in techniques used to form layers on a semiconductor wafer or the like, various methods have been proposed and implemented for achieving at least localized planarization of each layer before applying the next layer. Demand for continued improvements in planarization methods is escalating.

A commonly used planarization technique employing surficial polishing to planarize relatively large areas on a workpiece (generally termed herein a "wafer") is termed "CMP" (Chemical Mechanical Polishing or Chemical Mechanical Planarization). CMP removes surface irregularities on the wafer by combining physical polishing with chemical action, and is effective for polishing insulating layers or conductive layers. In CMP, a polishing agent in the form of a slurry is used in which granules of an acid or alkaline abrasive (e.g., silica, alumina, and cerium oxide commonly are used) are suspended in a liquid in which the abrasive granules are at least partially soluble. Polishing proceeds by applying an amount of the slurry and an appropriate polishing surface to the wafer surface and using relative motion of the polishing surface and wafer surface. The surface of the wafer is polished uniformly by keeping the pressure and the speed of the relative motion uniform across the wafer surface.

CMP exhibits certain problems, however. One important problem is achieving accurate detection of when a polishing step should be ended (i.e., detection of the optimal polishing endpoint). There is an urgent need for accurate detection of the polishing endpoint in-situ, i.e., detecting the extent of polishing while polishing is ongoing.

One conventional method for detecting the polishing endpoint utilizes changes in the torque of a motor rotating the wafer or polishing surface during polishing; e.g., detecting a change in friction when polishing has progressed depthwise sufficiently to encounter a layer beneath the target polishing layer. Unfortunately, this method is effective only in detecting when the polishing has progressed into a different layer underlying the layer being polished. Also, this method suffers from insufficient accuracy and precision.

Another conventional method involves measurement by optical interference of the thickness of a layer during polishing of the layer. According to one approach, an optical path is provided in a polishing pad through which a light beam is irradiated on the wafer surface being polished. According to another approach, a wafer-penetrating (e.g., infrared) light beam is directed through an optical path provided in the wafer carrier that contacts the reverse surface of the wafer while the obverse surface of the wafer is being polished. Alternatively, the light beam can be directed through an optical path provided in the polishing pad.

In the interference techniques, changes in an interference pattern in reflected light are monitored over time. I.e., the interference pattern changes as the thickness of the subject layer changes. The layer thickness or amount of polishing of the subject layer that has occurred can be calculated from such data.

Employing interference to measure layer thickness (i.e., measurement of time-varying changes in an interference pattern produced using reflected laser light) suffers from unreliability and errors caused by variations in measurement position.

For example, the surface being polished normally does not always have optically uniform characteristics. For example, FIG. 1(a) shows a wafer 1 (i.e., semiconductor wafer with multiple applied layers) at time of beginning polishing. The wafer 100 comprises metal conductive traces 102 or the like embedded in an insulating layer 101. The goal of polishing is to remove the protruding portions 103 of the insulating layer 101, thus planarizing the surface of the wafer 100. In FIG. 1(b), a portion of a metal layer 102 superposed on an insulating layer 101 is removed. With wafers such as shown in FIGS. 1(a) and 1(b), light passing through or reflected from the wafer surface would be influenced in many ways. For example, regions on which the metal layer 102 is present can interrupt transmitted light and produce more reflected light than regions lacking the metal layer 102.

Further with respect to FIG. 1(a), changes in layer thickness are normally limited to the protruding portions 103. Thus, variations in the amount of transmitted or reflected light can be measured only from the protruding portions. Furthermore, when surface irregularities exist, producing a satisfactory light signal indicative of layer thickness is impossible using conventional methods.

Thus, certain conventional methods (including conventional methods that utilize interference) suffer from the problem of excess noise entering the light signal, especially when the wafer contains metal conductive traces or the like.

In situ measurements are performed while polishing is ongoing and thus require that the wafer be moving while the measurements are obtained. Such a situation generates complex signals that tend to exhibit more instability (e.g., intensity of reflected light, etc.) than when the wafer is stationary. This is due in part to the fact that the light must pass through the polishing slurry which tends to disperse the light to varying degrees when in motion.

Another problem with contemporary layer-thickness measuring methods using interference is that the surface of the wafer to be polished inevitably includes minute irregularities. FIG. 2 shows a typical example of such irregularities in a wafer ready for polishing. The wafer comprises a Si substrate 105 and a $SiO_2$ layer 106. Within the $SiO_2$ layer 106 are metal conductors 107. Light reflected from the surface of such a wafer comprises the following components: interference light (designated "a") generated by reflection from concave portions 108 and convex portions 109, and interference light (designated "b") generated from further interference of the "a" interference light, including a diffracted light component arising from phase changes in the concave and convex portions 108, 109.

Conventional layer-thickness detection using optical interference assumes a flat irradiated surface. Layer-thickness data is obtained from the profile of the peaks and valleys of the interference pattern generated by reflected light and certain optical constants (the refractive index and an absorption constant) of the layer. Such calculations are performed with the assumption that components "a" and "b" as summarized above are not present. In such a scheme, the actual presence of the "a" and "b" components contributes an error factor to the calculations.

Hence, it is conventionally necessary to make measurements in a planar section of the wafer that lacks surficial irregularities. Unfortunately, it is difficult and impractical to find a planar section for performing measurements during polishing.

Another conventional technique for measuring layer thickness is ellipsometry as disclosed in Japanese Laid-Open Patent Document No. Hei 7-193033. This technique is diagrammed in FIG. 3. A light flux emitted from an optical-fiber light source 115 passes through a collimator lens 120. The collimated light passes through a polarizer 121 that transmits the linearly polarized light component. The linearly polarized light then passes through a quarter-wave plate 122 and is converted into elliptically polarized light. The elliptically polarized light passes through a half-wave plate 123 that changes the orientation of the elliptical axis. The elliptically polarized light is incident on the patterned surface 116 of a wafer 117, is reflected from the surface 116, and passes through a filter 124 that transmits linearly polarized light. The linearly polarized light passes through a condenser lens 125 to a detector 126. The polarized state of the light flux reflected from the patterned surface 116 changes depending upon the thickness of the patterned surface 116 and the polarization state of the incident elliptically polarized light. The output of the detector 126 comprises data, obtained while rotating the half-wave plate 123, that can be processed to determine the thickness of the patterned surface 116.

Ellipsometrically measuring layer thicknesses of wafers comprising multiple die patterns on separate regions of the wafer surface is inaccurate because of an adverse effect of the multiple dies on the wafer. One conventional approach for minimizing such effects involves actual recognition of the pattern(s) on the wafer. Based on such recognition information, a beam of inspection light is directed to a particular desired location on the wafer surface. However, this scheme requires that an optical system be capable of selectively directing the beam in a particular direction, which has been elusive to achieve. Also, such a configuration has proven to be incapable of inspecting layer thicknesses on a wafer while the wafer is rotating rapidly.

Because of the shortcomings of conventional technology for monitoring polishing in situ, one conventional alternative approach involves controlling polishing based on polishing time. Such a basis is inaccurate and imprecise, and the wafers typically must be fabricated with layers that are thicker than necessary.

Another conventional approach is to perform layer-thickness measurements off-line after polishing. A typical example of such an approach involves transporting the wafer to a measuring device and performing optical film-thickness measurements there. The results of the measurements are used in feedback control of the polishing step. If the measurement indicates that more polishing is needed, the wafer is sent back for further polishing. The measurement method typically includes either washing and drying the wafer before performing the measurements or performing the measurements underwater. (If the polished wafer is dried before it has been washed, the polishing material can become impossible to remove.)

Most polishing pads are sufficiently stable to allow polishing to be briefly stopped for the wafer to be transported for off-line measurements. However, off-line measurements typically require that many time-consuming, cumbersome, and error-engendering steps be performed including removing the wafer from the polishing head, transporting the wafer to a measuring device, aligning of the wafer in the measuring device, performing the measurement, and then transporting the wafer back to the polishing head. Also, considerable time is required from the moment polishing is interrupted to performing the measurements, which can destroy meaningful feedback.

SUMMARY OF THE INVENTION

An object of the present invention is solve the problems, discussed above, of the prior art by providing methods and apparatus for measuring a thickness of a layer, wherein the layer is subjectable to a process that causes a time-varying change in thickness and/or planarity. For example, the methods and apparatus of the invention are especially applicable to wafer polishing as encountered in semiconductor device manufacturing, and fulfill a need to detect accurately and easily, either during or after polishing, the extent of polishing imparted to a layer (e.g., an insulating layer or a conductive layer) on a wafer substrate. The methods and apparatus are especially applicable to measuring thickness of such layers that are patterned or otherwise have minute surficial irregularities.

According to a first aspect of the invention, apparatus are provided for measuring the thickness of a layer on a workpiece comprising the layer applied to a planar substrate (e.g., semiconductor wafer). According to a preferred embodiment, the apparatus comprises a probe light source that produces a beam of probe light that preferably has multiple wavelengths. The probe light source is operable to direct the beam of probe light to be incident on the layer and produce a signal light from reflection of the probe light from or transmission of the probe light through the layer. The apparatus also comprises a light detector situated so as to receive and detect multiple wavelengths of the signal light and produce a corresponding electronic signal encoding data regarding intensity at various wavelengths of the detected signal light. A processor preferably is connected to the light detector. The processor is configured (e.g., programmmed) to calculate, from the electronic signal, a spectrum of intensity versus wavelength. The spectrum provides data indicating the thickness and/or planarity of the layer.

An example embodiment of the apparatus summarized above comprises first, second, third, fourth, and fifth lenses. The first, second, and third lenses are situated between the probe light source and the workpiece so as to refract the probe light propagating from the probe light source to the workpiece. The fourth and fifth lenses are situated between the workpiece and the light detector so as to refract the signal light propagating from the workpiece to the layer. A beamsplitter is located between the second and third lenses. Probe light propagating from the second lens passes through the beamsplitter to the third lens, and signal light propagating from the workpiece through the third lens is reflected by the beamsplitter to the fourth and fifth lenses. A diffraction grating is situated between the fifth lens and the light detector. Preferably, a beam-clipping aperture (i.e., an aperture that trims the transverse profile of the probe light beam) is situated between the second and third lenses, wherein the second lens is a collimating lens. Also, a pinhole aperture is situated preferably between the fourth and fifth lenses, wherein the fourth lens is a condenser lens.

According to another aspect of the invention, apparatus are provided for measuring the extent of surficial polish of a patterned layer on a workpiece comprising a planar wafer on which the patterned layer has been applied. A preferred embodiment of such an apparatus comprises a polishing assembly that holds the workpiece and subjects the patterned layer to polishing that removes at least portions of the patterned layer as the patterned layer is being planarized by the polishing. The apparatus also comprises a polishing-extent measuring assembly that comprises a probe light source, a light detector, and a processor. The probe light source produces a beam of probe light having multiple wavelengths and that directs the beam of probe light to be incident on a patterned region of the patterned layer. The light detector is situated so as to receive and detect signal light produced by either transmission of probe light through or reflection of probe light from the patterned region of the patterned layer. The light detector is operable to detect multiple wavelengths of the signal light and produce an electronic signal including data regarding light intensity at various wavelengths of detected signal light. The processor, to which the light detector is connected, is configured to calculate, from the electronic signal, a spectrum of intensity or transmittance (depending upon whether the probe light was reflected from or transmitted through, respectively, the patterned layer) versus wavelength. Such a spectrum provides data indicating the extent of polishing of the patterned layer.

The polishing assembly preferably comprises a wafer carrier that holds the wafer during polishing, and a polishing plate. A polishing pad is attachable to the polishing plate.

The processor is preferably configured to calculate a spectrum, whenever the probe light reflects from or passes through the patterned region of the patterned layer, that exhibits at least one maximum or minimum. The processor also preferably monitors at least one of the following in determining the extent of polishing of the patterned layer: (1) an appearance or disappearance of a maximum or minimum in the spectrum; (2) a change in a wavelength at which a maximum or minimum in the spectrum; and (3) a change in an intensity at a particular wavelength at which a maximum or minimum is located in the spectrum. Such events provide a stable signal that is reproducible from one similar workpiece to the next; the magnitude of such events is proportional to corresponding changes in the amounts of reflected or transmitted light and is not easily affected by such factors as interspersed polishing slurry, a lack of uniformity in layer thickness, or irregularities in the surface of the patterned layer or in its interface with the substrate or a deeper layer. If desired, the results obtained with a current workpiece can be compared by the processor to data obtained from a previous workpiece. Also, the extent of polishing of the patterned layer can be measured indirectly from data concerning the initial thickness of the workpiece and the thickness at a particular time during polishing.

Generally speaking, in determining a "polishing endpoint" (i.e., a desired thickness of the subject layer at which polishing should stop), the spectral reflectance or spectral transmittance curves typically include features that differ significantly from the spectral reflectance or spectral transmittance curves, respectively, produced before reaching the polishing endpoint. Thus, by measuring and/or calculating data pertaining to such features, the polishing endpoint can be detected accurately.

The probe light source preferably produces a beam of probe light having a transverse area larger than an area of a die on the patterned surface. The patterned surface of a wafer to be polished typically comprises multiple dies each comprising a large number of minute elements or "features." Thus, on the feature level, the surface of the patterned layer is not uniform. Thus, whenever the transverse profile of the probe light is substantially smaller than a die, the signal light produced by reflection or transmission of the probe light is influenced by the minute features, and exhibits changes depending upon the locus of incidence of the probe light. This can produce undesirable noise. By making the "diameter" of the probe light beam substantially larger than a feature, the signal light is much more uniform regardless of the locus of incidence. This allows the light detector to produce a more stable signal.

In view of the above, the light detector and processor preferably produce the spectrum and thus determine the extent of polishing whenever the probe light is incident on a patterned region of the patterned layer. The principle behind the detection of the extent of polishing or the polishing endpoint makes it possible to detect the interaction of probe light with multiple layers in the patterned regions. For this reason, when the probe light is incident on a non-patterned region, obtaining a signal having sufficient data to determine layer thickness is more difficult. Hence, more accurate measurements are obtained when the probe light is incident on patterned regions.

According to another embodiment, the polishing plate and pad define a window that is transmissive to the probe light so as to allow the probe light to pass through the window to the patterned surface as the patterned surface is being polished by the polishing pad. Since polishing normally is performed by rotating the wafer (held by the wafer carrier) against the polishing pad (attached to a rotating polishing plate), the window allows measurements to be obtained in situ (i.e., while polishing is ongoing).

Another scheme for obtaining in situ measurements is to extend a portion of the wafer beyond an edge of the polishing pad. In such an instance, the probe light can be incident on the portion of the wafer extending beyond the edge.

The probe light preferably comprises multiple wavelengths. Upstream of the light detector can be a filter that selects one or more specific wavelengths of signal light for routing to the light detector. Such a scheme can permit faster detection of polishing extent compared to routing all probe-light wavelengths to the light detector.

If the patterned surface defines convex features and concave features, excellent measurement results can be obtained if the probe light is incident on the patterned surface at an angle of incidence θ greater than zero. If H is an elevational difference between the convex and concave features and d is the width of the concave features, then preferably θ≥tan(−1d/2H) to eliminate from the signal light a substantial amount of light reflecting from the concave features. This allows the layer thickness to be determined based on the same principle as when the subject layer surface is planar.

An apparatus as described above having a polishing assembly and a polishing-extent measuring assembly also can comprise a robot arm for conveying the workpiece from an entry-side standby position (e.g., an entry-side standby stage) to the polishing assembly for polishing, and from the polishing assembly to an exit-side standby position (e.g., an exit-side standby stage) to await downstream processing. In such a configuration the polishing-extent measuring assembly can be incorporated in the robot arm to permit a determination of the extent of polishing of the patterned layer to be made either as the robot arm is transporting the workpiece or when the robot arm has placed the workpiece on the polishing assembly.

If the apparatus comprises an exit-side standby stage, the polishing-extent measuring assembly can be incorporated in the exit-side standby stage. Such schemes avoid possible measurement instability associated with in situ measurements, and permit measurements to be made sooner (with correspondingly faster feedback to the polishing assembly) than with off-line measurements of layer thickness.

As an alternative to incorporating the polishing-extent measuring assembly in a robot arm, the assembly can be incorporated in the wafer carrier used to hold the workpiece during polishing and to urge the patterned surface of the workpiece against the polishing pad. In such an instance, the polishing-extent measuring assembly measures the extent of polishing of the patterned surface while the workpiece is being held by the wafer carrier. Preferably, the processor is operable to modify a condition of polishing of the patterned layer in response to a particular extent of polishing of the patterned layer as determined by the polishing-extent measuring assembly.

According to another aspect of the invention, an apparatus is provided for measuring the thickness of a layer of a workpiece consisting of a planar substrate and multiple layers applied to a surface of the substrate, wherein at least one of the layers has minute surface irregularities. Such an apparatus comprises a source of a beam of probe light, a probe-light optical system, a light detector, and a processor. The probe-light optical system directs a beam of probe light (produced by the probe light source) to be incident, at an incidence angle, on a surface of an outermost layer of the multiple layers and reflect from the surface as signal light. The signal light reflects from the surface at an angle equal to the incidence angle, wherein the surface irregularities cause the signal light to exhibit an interference. The light detector receives the signal light, measures a pattern of the interference of the signal light, and produces from the received signal light a corresponding electrical signal. The processor, which is connected to the light detector, is configured to measure the interference pattern and produce a spectrum having a characteristic indicative of the thickness of the layer.

According to another aspect of the invention, an apparatus is provided for measuring the thickness of a patterned surface layer on a semiconductor wafer, wherein the patterned surface layer comprises multiple dies each defining a circuit pattern for a semiconductor device. The apparatus comprises a probe-light optical system and a light detector. The probe-light optical system directs a probe light flux at the patterned surface layer, and adjusts the transverse profile of the probe light flux such that the probe light flux, when incident on the patterned surface layer, illuminates an area on the patterned surface layer equal in area to an integral multiple of one die and having sides parallel to the die. The probe light can be either transmitted by or reflected from the illuminated area so as to produce a corresponding signal light exhibiting an interference. The light detector receives the signal light, measures a characteristic of the interference of the signal light, and produces from the received signal light a corresponding electrical signal having a characteristic indicative of the thickness of the patterned surface layer. The apparatus can comprise a processor connected to the light detector. The processor measures the interference pattern and produces a spectrum having a characteristic indicative of the thickness of the layer.

The probe-light optical system of the embodiment summarized above can be used to adjust the transverse profile of the probe light incident on the patterned surface layer to have a profile exhibited either by one die or by multiple adjacent dies. The probe-light optical system can comprise a visual field aperture that clips the probe light flux to the desired transverse profile.

The visual-field aperture can be adjustable.

To such end, the visual-field aperture can be defined by a rotary plate defining multiple differently sized apertures through which individual apertures the probe light flux can selectively pass. Alternatively, the visual-field aperture can be defined by at least one laterally movable plate.

An optical element (e.g., a diffraction grating) can be situated between the light detector and the patterned surface layer. The optical element is used to separate from each other various diffraction orders of the signal light for selective delivery to the light detector. An aperture can be placed selectively downstream of the optical element to select one or more particular diffraction orders of signal light for propagation to the light detector. Such an aperture can be a pinhole aperture.

A condenser lens can be situated downstream of the patterned surface layer to receive the signal light propagating from the illuminated area of the patterned surface layer and condense the signal light at a focal point. A mirror defining an aperture can be situated at the focal point. Such a mirror is situated such that a first selected diffraction order of the signal light passes through the aperture to a first light detector, and a second selected diffraction order of the signal light is reflected by the mirror to a second light detector.

The apparatus can further comprise a condenser lens situated downstream of the patterned surface layer. The condenser lens is used to receive a selected order of diffracted signal light and condense the received signal light at a focal point. An optical fiber having an entrance terminus can be located at the focal point so as to retrieve the selected diffraction order of signal light and deliver the retrieved light to the light detector.

The probe-light optical system in the apparatus summarized above can include a probe light source. The probe light source can be used to produce a probe light having a certain wavelength bandwidth. In such an instance, the light detector can produce, from the characteristic of interference of the signal light, an electrical signal encoding a distribution of spectral intensity of the signal light flux over the bandwidth.

Alternatively, a probe light flux can be used that produces a substantially monochromatic probe light that is reflected from the patterned surface. In such an instance, the light detector can produce an electrical signal encoding an intensity distribution of the signal light flux.

The foregoing and additional features and advantages of the present invention will be more readily apparent from the following detailed description, which proceeds with reference to the accompanying drawings.

BRIEF DESCRIPTION OF THE DRAWINGS

FIGS. 1(a)-1(b) depict a conventional CMP polishing process, wherein FIG. 1(a) shows polishing of an interlayer insulating layer, and FIG. 1(b) shows polishing of a metallic layer (damascene). In each figure, the upper portion shows a condition before beginning polishing and the lower portion shows a condition after polishing.

DETAILED DESCRIPTION

Details of the invention are exemplified in multiple example embodiments that represent the current best mode of the invention.

Example Embodiment 1

Figure 4:
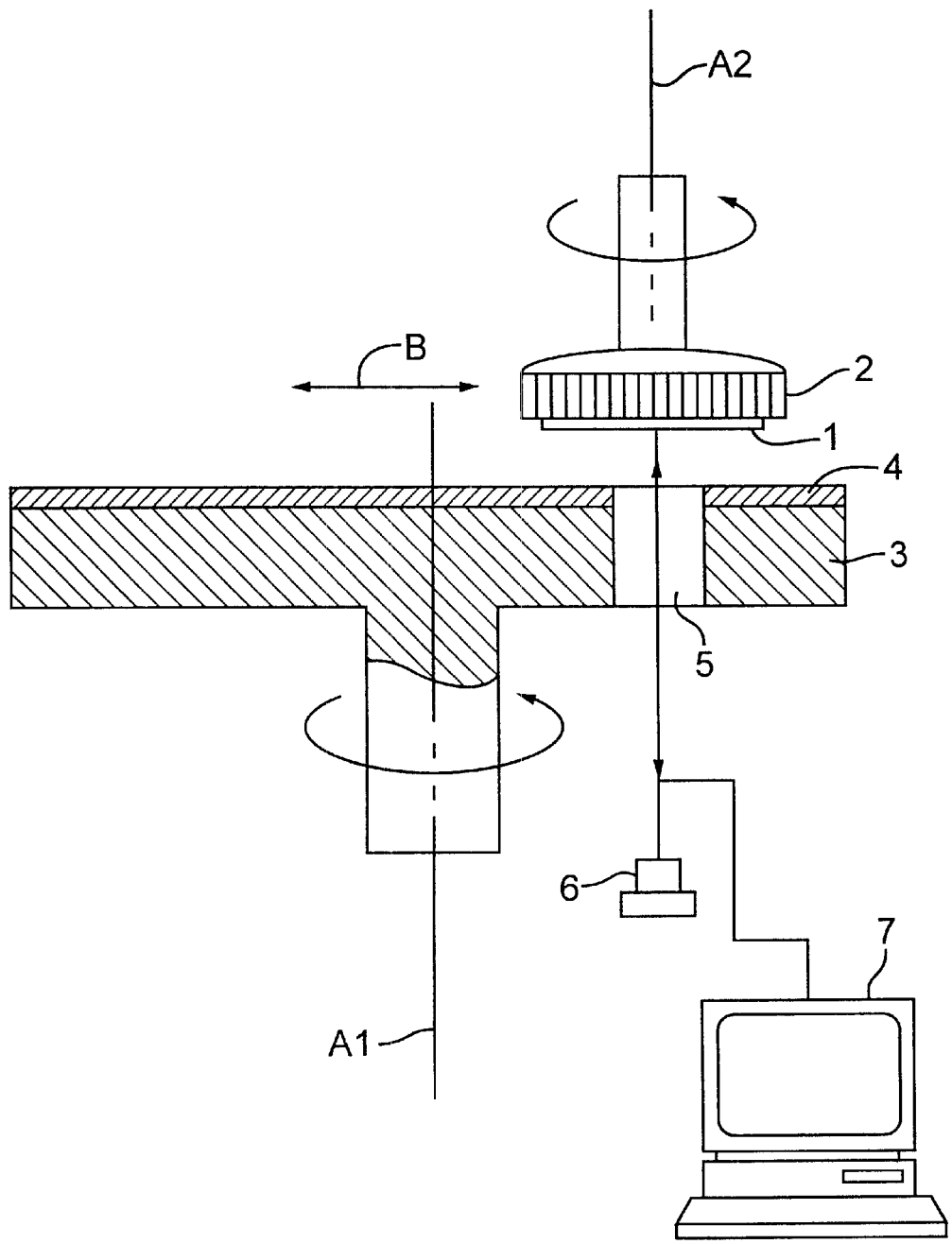
FIG. 4 illustrates certain features of a polishing device according to Example Embodiment 1.
Figure 5:
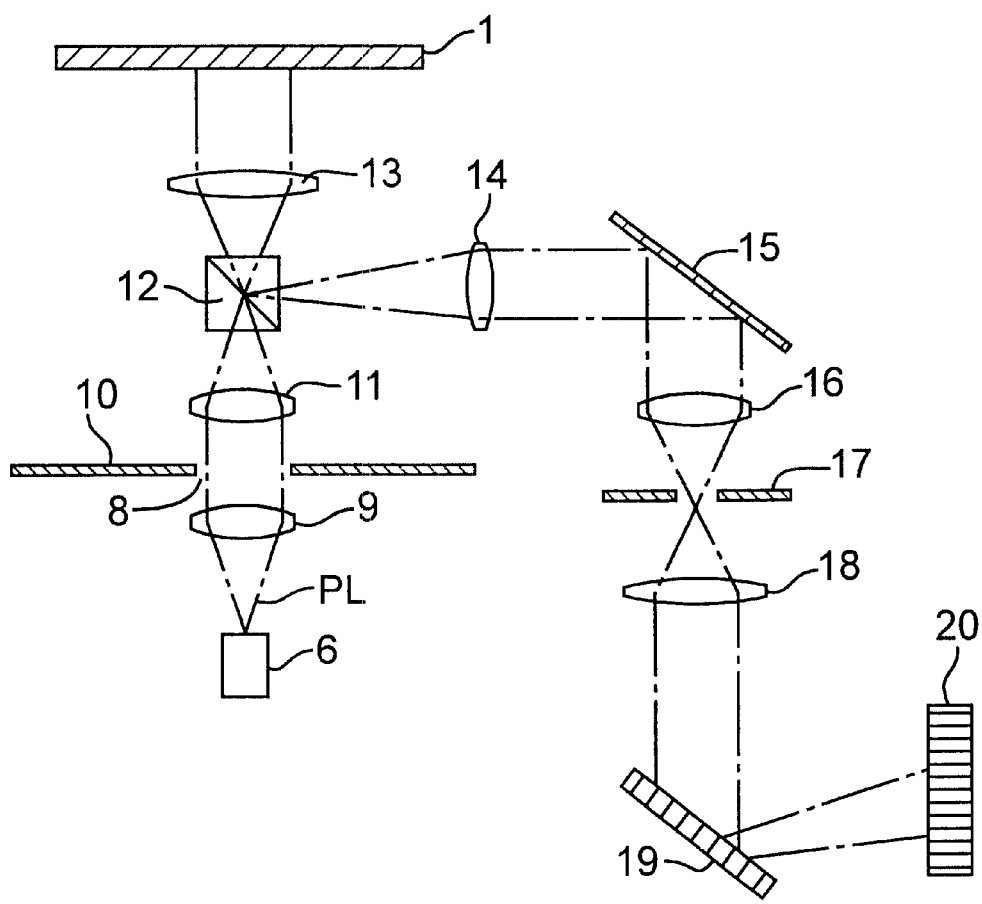
FIG. 5 schematically illustrates details of the optical system used in the FIG. 4 device.

This example embodiment is diagrammed in FIGS. 4 and 5. A wafer 1 to be polished is held by a wafer carrier 2. A polishing plate 3 is provided with a polishing pad 4. The polishing plate 3 together with the polishing pad 4 rotate about a first axis A1. The wafer carrier 2 rotates about a second axis A2 while urging the wafer 1 onto the surface of the polishing pad 4 and undergoing a reciprocating motion (arrow B). Thus, the surface of the wafer 1 is polished by the polishing pad 4.

A light-transmitting window 5 (preferably made of quartz) extends through the polishing plate 3 and the polishing pad 4. A light flux ("probe light") produced by a light source 6 propagates through the window 5 and impinges upon the surface of the wafer 1. Light reflected from the wafer 1 (i.e., "signal light") is optically split and detected by an optical system as shown in FIG. 5 (and discussed below). The data corresponding to the detected signal light is processed by a computer 7 that determines the extent of polishing or polishing endpoint from such data processing.

The optical system of FIG. 5 comprises the light source 6 (e.g., xenon lamp) that produces the probe light flux PL. The probe light PL is collimated by a lens 9, passes through a slit 10a defined by a plate 10, and is condensed by a lens 11 onto a beamsplitter 12. The probe light PL passes through the beamsplitter 12, passes through the window 5, (not shown in FIG. 5) is recollimated by a lens 13, and impinges on the surface of the wafer 1.

Signal light produced by reflection of probe light from the wafer 1 returns through the window 5 and is condensed by the lens 13 onto the beamsplitter 12. The beamsplitter 12 reflects the signal light toward a lens 14 that collimates the light. The signal light is reflected by a mirror 15 and condensed by a lens 16 onto a pinhole aperture 17a defined by a plate 17. The pinhole aperture 17 removes noise components such as dispersed and diffracted light. The signal light impinges on a diffraction grating 19 after passing through a lens 18. Signal light from the diffraction grating 19 enters a linear sensor 20 operable to measure the spectral intensity of the signal light. The sensor 20 is connected to the computer 7 (FIG. 4).

The computer 7 detects changes in the distribution of the spectral intensity of the signal light reaching the detector 20. Using a predetermined algorithm, the computer 7 calculates from the spectral-intensity distribution the layer thickness or the polishing endpoint of the layer being polished on the wafer. From data concerning the initial thickness of the wafer and the thickness of the layer being polished, the extent of polishing is determined, whether the polishing is being performed on an interlayer insulating layer or on a conductive (e.g., metal) layer.

When the probe light PL strikes a portion of the wafer 1 lacking any pattern (i.e., a "blank" region of the wafer surface), the spectral reflectance or transmittance of signal light exhibits a relatively simple distribution ("waveform") from which a determination of layer thickness is easily performed. However, blank regions of the wafer surface are normally very small and normally represent a very small percentage of the wafer surface. Also, the locations of blank regions normally are not the same from one wafer to the next. The apparatus shown in FIG. 5 is especially suitable for use in such situations. In other words, this example embodiment is not limited to applications in which probe light is used to irradiate blank regions of the wafer surface. Rather, this example embodiment is especially suitable for measuring layer thickness while irradiating any of various regions of the wafer surface that include conductive features (e.g., electrode features) or any of various other pattern features including features having irregular profiles.

With respect to signal light reflected from patterned regions of the wafer 1, the wavelengths generated by the subject layer (i.e., layer being or about to be polished) and each region thereof are indicative of the physical characteristics of the layer and the pattern defined by the layer. The wavelength-dependent intensity waveforms (spectral characteristics) of the signal light normally have maxima and minima (peaks and valleys) generated by complex interference effects.

If the particular structure of the layers on the subject wafer (i.e., the two-dimensional profile and thickness of each of the layers) on the subject wafer are known in advance, it is possible to determine the thickness of the layer being polished (i.e., the uppermost layer) by analyzing the spectral waveform(s) of signal light produced by reflection from the wafer surface.

Several factors can interfere with a reflected light signal. Such factors include, for example, interspersed slurry, variations in optical constants (e.g., refractive index) due to a lack of uniformity of the layer, and irregularities in the layer surfaces or interfaces. For this reason, errors can increase when one is attempting to measure the extent of polishing or the polishing endpoint from the absolute value of the reflected light signal.

With respect to the present invention, the wavelength dependence (spectral reflectance or spectral transmittance) of the intensity of signal light provides important data for determining layer thickness. Other important data are obtained from changes in the maxima and minima of intensity at specific wavelengths of such light. It was surprisingly found that these data are not sensitive to the various error factors noted above, compared to conventional methods of detecting the polishing endpoint from time-dependent changes in the absolute value of the amount of reflected light.

When a subject wafer is multilayered and has a complex structure, it can be difficult to perform calculations of the layer thickness from the spectral characteristics of reflected signal light. In such an instance, it is effective to calculate the spectral reflected waveform in advance (this is easier than performing a reverse calculation from the waveform itself) from data concerning the wafer structure and the specific layer thickness desired when the polishing endpoint is reached. In determining the polishing endpoint, the shape of the waveform calculated in advance is compared to the shape of a measured waveform. (Typically, the maxima and minima observed in the calculated waveform are at the same wavelengths as maxima and minima in the measured waveform.)

Polishing of a dummy wafer can be performed (in advance) in which polishing is conducted to a desired endpoint that provides target values for actual measured values obtained when an actual production wafer is polished to the desired endpoint. I.e., the dummy wafer provides a realistic reference for determining the polishing endpoint of similar actual wafers.

The foregoing discussion is based primarily on measuring the thickness of dielectric films (interlayer insulating layers) that generate optical interference. However, this example embodiment can be applied equally well to measuring the thickness of a metal (conductive) layer. I.e., when polishing the entire surface of a conductive layer intended after polishing to define an inlaid (damascene) pattern of conductive traces, regions with and without exposed metal generally appear as the polishing proceeds. The spectrum of signal light produced by reflection from conductive regions is normally smooth (except whenever surficial irregularities are significant). During polishing, as the metal film disappears and the conductive pattern appears, the spectral waveform changes significantly (a number of maxima and minima appear) due to the effect of the dielectric layer on interference occurring in reflected light. By observing these variations, the polishing endpoint (e.g., the appearance of the dielectric layer) can be detected.

Wafers to be polished using CMP can be destined to become any of various integrated devices (e.g., memory devices or CPUs). Such devices normally comprise a large number of regions (unit cells) having the same periodic features. For example, a 64-megabit DRAM has a unit cell measuring about $(1~\mu m)^2$. A "chip" containing all the constituent unit cells has an area ("die" area) of approximately $(1~cm)^2$. From a microscopic perspective, the cells may appear non-uniform. However, from a macroscopic perspective (generally viewing areas of several $(mm)^2$ to several $(cm)^2$, the cells and their arrangement appear uniform.

If a "beam" of probe light (having a transverse profile that is significantly larger in area than the area of a unit cell) is irradiated on the wafer, the resulting signal is essentially uniform. The signal can be obtained without having to control the incidence location of the light on the wafer or can be obtained while controlling the light incidence position in a very simple manner (e.g., avoiding certain locations such as edges).

The spectral measurements are effective whether performed in-line or off-line. The measurements are also effective in situ, i.e., while polishing is underway. The polishing plate 3 and polishing pad 4 are normally larger than the wafer 1. In order to perform in situ measurements, it is possible to incorporate the light source 6 and optical system of FIG. 5 in the polishing plate 3. It is also possible to measure the reflected/incident probe light from a region of the wafer 1 that extends beyond the polishing pad 4.

During measurements performed while polishing the wafer 1, both the wafer and the polishing pad 4 are moving constantly. I.e., the polishing plate 3 and the wafer carrier 2 are rotating and the wafer carrier 2 also undergoes reciprocating motion. Thus, with a stationary light source 6, the location on the wafer 1 that is being illuminated by the probe light PL (and thus being measured) is changing constantly, which would be expected to impart certain variations in the optical signals reflected from the wafer 1. This effect can be minimized, however, by illuminating a relatively large region (relative to a unit cell) of the wafer and/or by averaging the signal produced by the detector 20 from the reflected light. Thus, if the wafer should slip during polishing such that it is no longer in a measurement position (e.g., move away from the window 5) or if too much probe light PL impinges on a region of the wafer lacking any pattern features (e.g., an edge of the wafer), then variations in the light signals would be greater.

Since many variations that arise due to probe light PL reflecting from non-uniform regions of the wafer 1, when considered on a macro level, are discontinuous and quantitatively large, it is possible to remove them at the signal-processing stage. It is also possible to remove such variations by controlling the positions on the wafer 1 that are actually illuminated. I.e., the probe light PL can be illuminated only on certain pattern features on the wafer 1, as observed using, e.g., a charged-coupled device (CCD). With such a scheme, signals are not obtained unless the probe light PL is being illuminated on specific (and periodic) structures.

It is preferable not to produce a reflected-light signal when the signal obtained is not suitable for determining layer thickness. This normally involves being aware of the pattern on the wafer 1 and performing signal detection when, for example, the wafer can be irradiated only on specific periodic structures. If "$t_p$" is regarded as a time period required for polishing and "p" is the required polishing precision (%), then a time period necessary to perform polishing to the required precision is ($t_p$) (p/100). If the time during which signal detection is not appropriate is sufficiently small in comparison to the time period required for polishing, then excess polishing reliably can be avoided.

When obtaining measurements from a fixed position while the wafer is turning at high speed during polishing, the amount of time needed to make measurements is important. It is preferred that the measurements be made as rapidly as possible, and that the light source 6 used in this example embodiment produce multiple wavelengths of probe light (e.g., a source of white light or of a light having a spectral white-light component). With such light used as the probe light, the reflected signal light can be processed spectrally using a diffraction grating or hologram element, and the intensity of each wavelength can be detected using multiple split-light sensors (incorporated into the sensor 20). Only the reflected signal light is gathered for measurement and rapid measurements are possible because spectral processing can be performed substantially instantaneously.

When measuring spectral characteristics in this manner, it is preferred that the wavelength distribution of the light source 6 be considered (i.e., measured in advance, or be measured in real time using a branching optical path). Using such a light source can decrease the amount of information that can be obtained per wavelength. However, use of a color-selecting filter or a dichroic mirror downstream of the light source 6 can be used in a high-speed measuring configuration where the wavelength distribution information of the reflected signal light can be obtained.

If time permits, different single wavelengths of probe light can be delivered sequentially to the wafer. In such an instance, the spectral characteristics of the reflected light are determined individually for each wavelength.

In FIG. 4, the probe light is directed to the wafer surface from the polished-surface side (obverse side) of the wafer. Alternatively, a light source can be implanted, for example, in the wafer carrier 2 and directed toward the wafer 1 from the reverse side of the wafer 1. With such an alternative configuration, the state of polishing still is determined from the wavelength dependence (i.e., the spectral characteristics) of signal light produced by reflection of probe light from the wafer surface being polished. The light source in such an instance is preferably an infrared multi-component light capable of passing through the thickness dimension of the wafer.

Figure 1A:
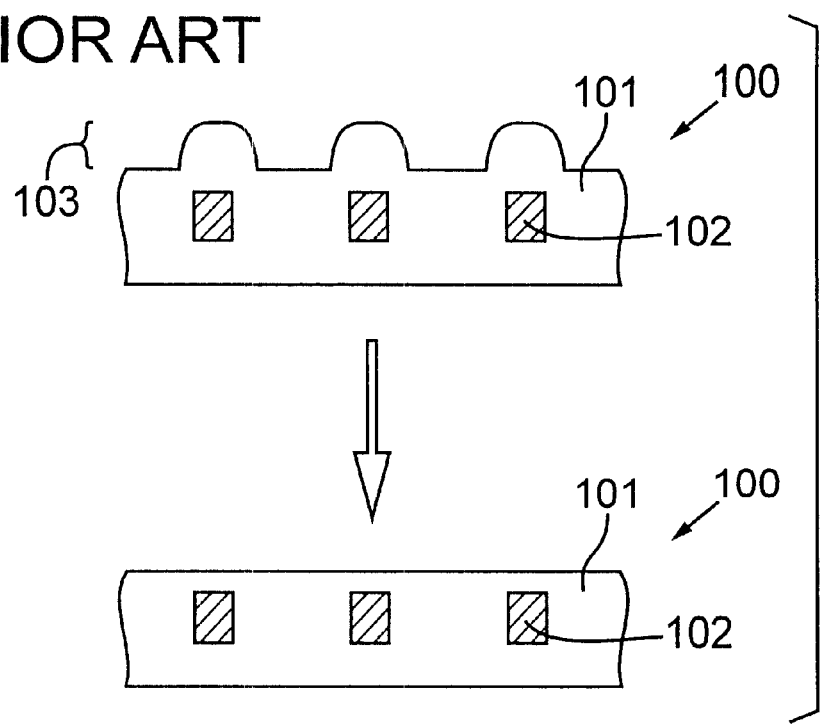
Figure 1B:
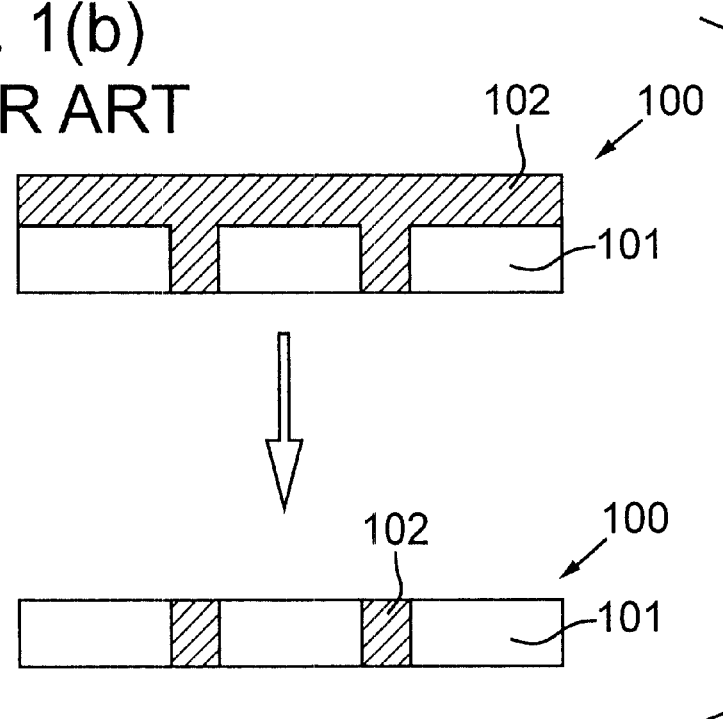
Figure 2:
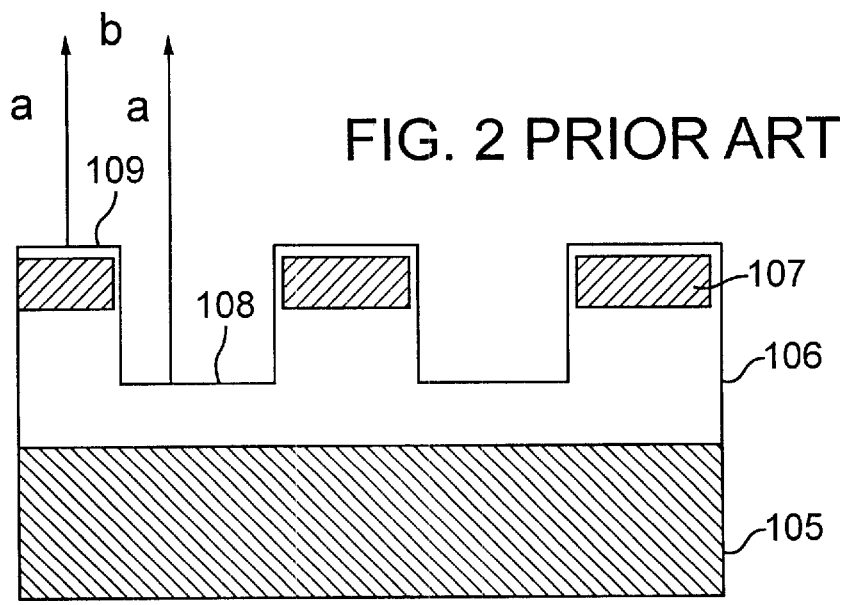
FIG. 2 is an elevational sectional view of a conventional wafer having surface irregularities.
Figure 3:
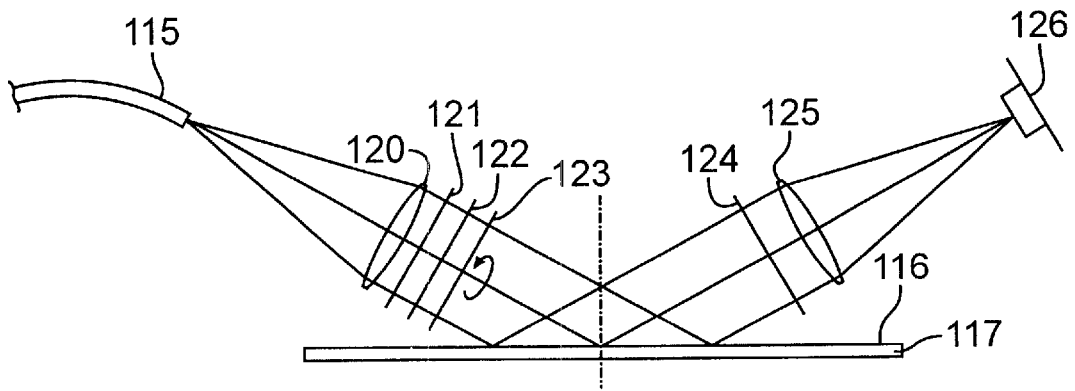
FIG. 3 is a schematic optical diagram of conventional optical system for determining polishing endpoint.

In FIG. 1, the window 5 is provided in the wafer carrier 2. After the probe light has passed through the wafer 1 (and become signal light), the spectral characteristics of the signal light can be retrieved and measured by a light-sensor on the wafer-carrier side. Alternatively, a light-projecting module can be provided on the wafer-carrier side and a light-sensing module provided on the polishing-plate side at which the spectral transmittance characteristics are measured.

Example Embodiment 2

Figure 6:
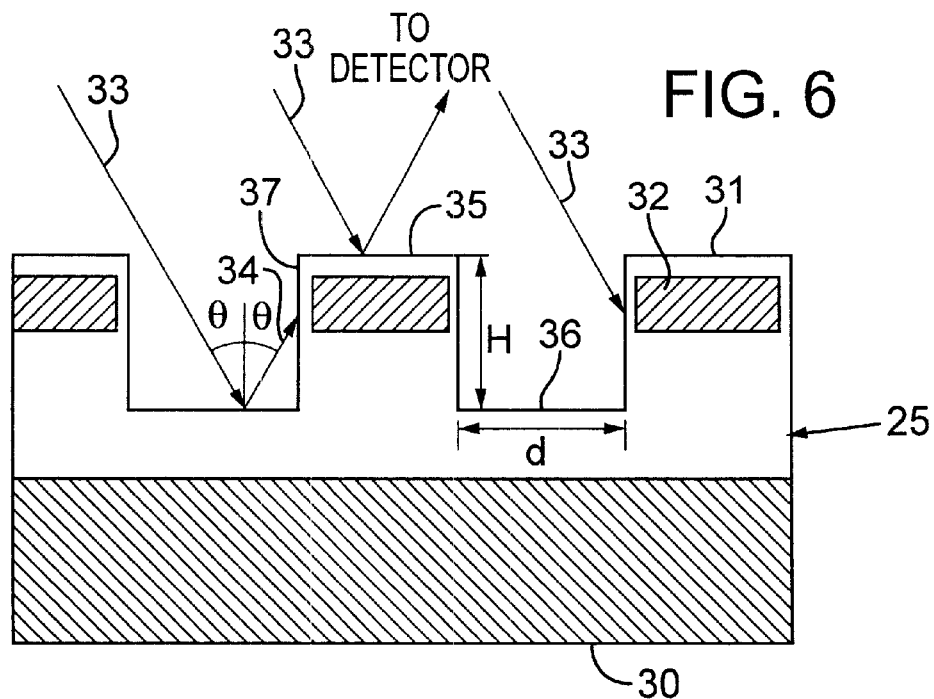
FIG. 6 illustrates certain features of a layer-thickness measuring principle employed in Example Embodiment 2.

With respect to this example embodiment, FIG. 6 illustrates a measurement principle applicable during use of a layer-thickness-measurement apparatus pertaining to this invention for measuring layer thickness on a semiconductor wafer. The wafer 25 shown in FIG. 6 comprises a $SiO_2$ layer 31 formed on a Si substrate 30. A metal conductor layer 32 is covered by the $SiO_2$ layer 31. Polishing of such a wafer 25 would occur on the upper surface (in the figure).

Probe light (arrow 33) is incident on the wafer at an angle θ. Reflected probe light (i.e., signal light, arrow 34) reflects from the irradiated surface at an angle θ substantially equal to the angle of incidence. The irradiated surface comprises convex features 35 and concave features 36. In FIG. 6, H denotes the elevational difference between the convex and concave features and d denotes the width of the concave features 36. Whenever θ≥tan(−1d/2H), the incident probe light 33 strikes side walls 37 of the convex features 35 and is not detected. In fact, any light that strikes a side wall 37 or strikes a metal conductor layer 32 is absorbed or reflected. Any such signal light either does not reach the reflected-light detector or enters the detector after being reflected many times as stray light. Light that has been reflected numerous times and enters the detector as stray light does not contribute to interference. This is because, after multiple reflections, the optical path length of such light becomes greater than the coherence length.

For this reason, signal data from light reflected from the convex features 35 (i.e., optical interference of only light reflected from the convex features) is selected out and processed as if the data were generated by reflection of probe light from a planar flat surface, not an irregular surface. At the detector, no interference occurs between signal light reflected from the convex features 35 and signal light reflected from the concave features 36.

Figure 7:
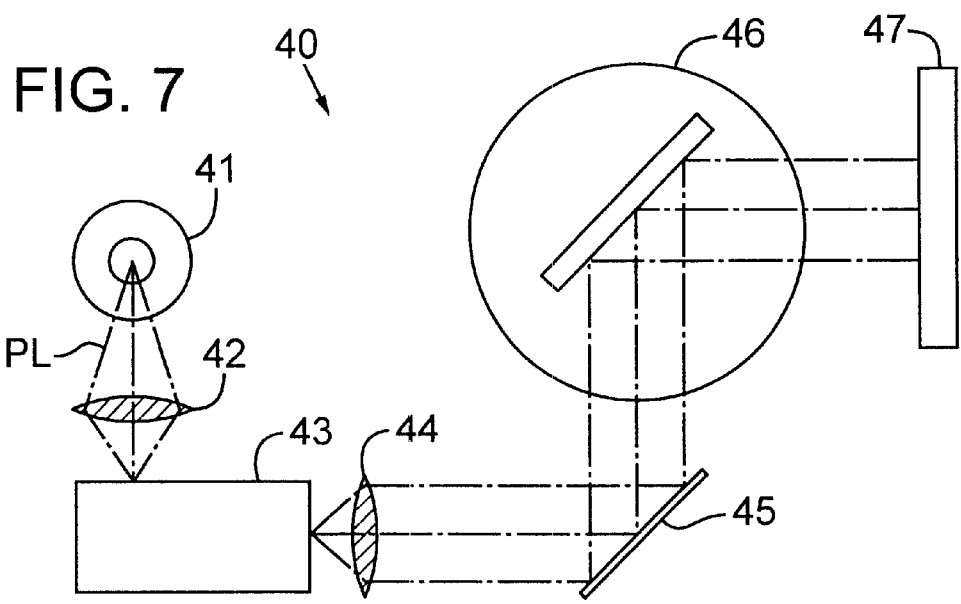
FIG. 7 schematically illustrates details of the optical system used in the device of Example Embodiment 2.

FIG. 7 depicts a representative light-projecting module 40 according to this example embodiment. Probe light PL is produced by a light source 41 (preferably a xenon lamp), is condensed by a condenser lens 42, and is converted into monochromatic light by a monochromator 43. Next, the probe light PL is collimated by a collimator lens 44. The probe light PL then reflects from a mirror 45 and enters a goniometer 46. The probe light then strikes the object 47 (e.g., wafer) to be measured at an angle of incidence specified by the goniometer 46. Several wavelengths of monochromatic light are generated by the monochromator 43 and interference data pertaining to each is obtained. (Light-detection and measurement can be performed by a detector configuration as discussed in Example Embodiment 1 and are not further described here.)

Figure 8:
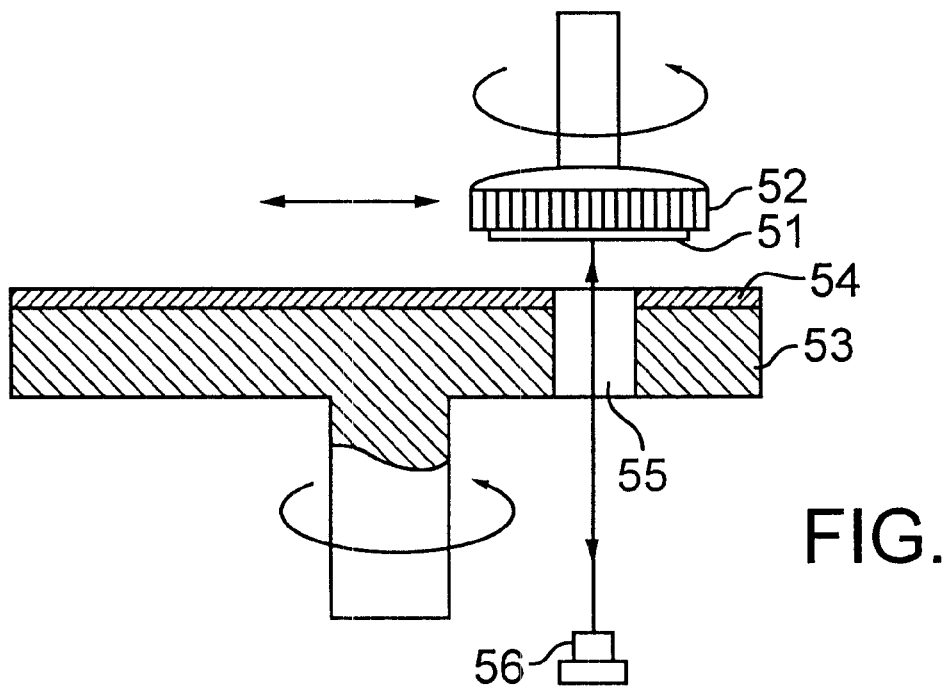
FIG. 8 illustrates certain features of a polishing device according to Example Embodiment 2.

Certain aspects of this example embodiment are illustrated further in FIG. 8, in which the object to be polished (e.g., wafer) 51 is held by a wafer carrier 52.

The surface of a polishing plate 53 is provided with a polishing pad 54. During polishing, the polishing plate 53 rotates about its axis, and the wafer carrier 52 rotates about its axis while undergoing a reciprocating motion as the wafer carrier 52 urges the wafer 51 against the polishing pad 54. The polishing plate 53 and the polishing pad 54 are provided with a light-transmitting window 55 (preferably quartz). Item 56 is a layer-thickness-measurement apparatus as discussed above. The layer-thickness-measurement apparatus 56 projects a probe light flux onto the surface of the wafer 51 through the window 55, detects signal light produced by reflected probe light, performs calculations necessary to determine the layer thickness from the signal light, and stops polishing when the layer on the wafer 51 has been reduced by polishing to the desired thickness.

As an alternative to directing probe light through the window 55 as described above, layer-thickness measurements also can be obtained by extending the wafer 51 beyond the outside diameter of the polishing plate 53 and the polishing pad 54, and measuring probe light reflected from the portion of the wafer 51 so exposed.

Example Embodiment 3

Figure 13:
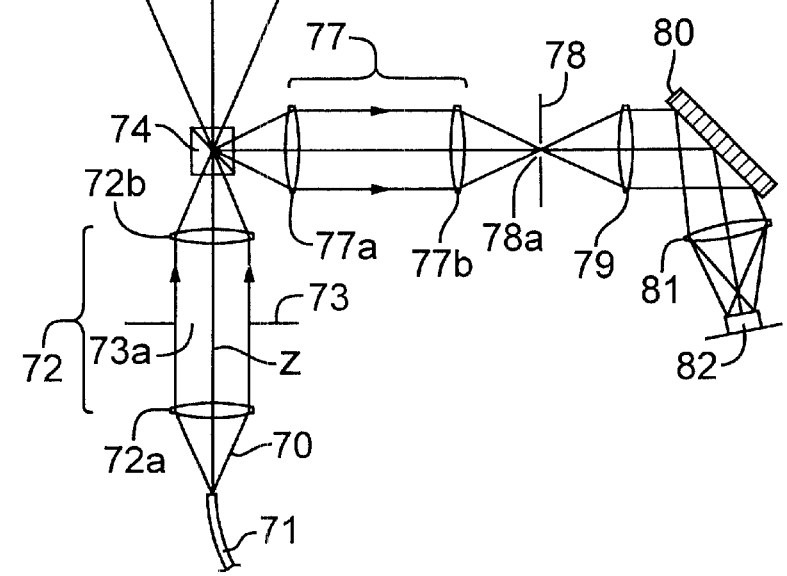
FIG. 13 schematically depicts a layer-thickness measuring apparatus according to Example Embodiment 3.
Figure 14:
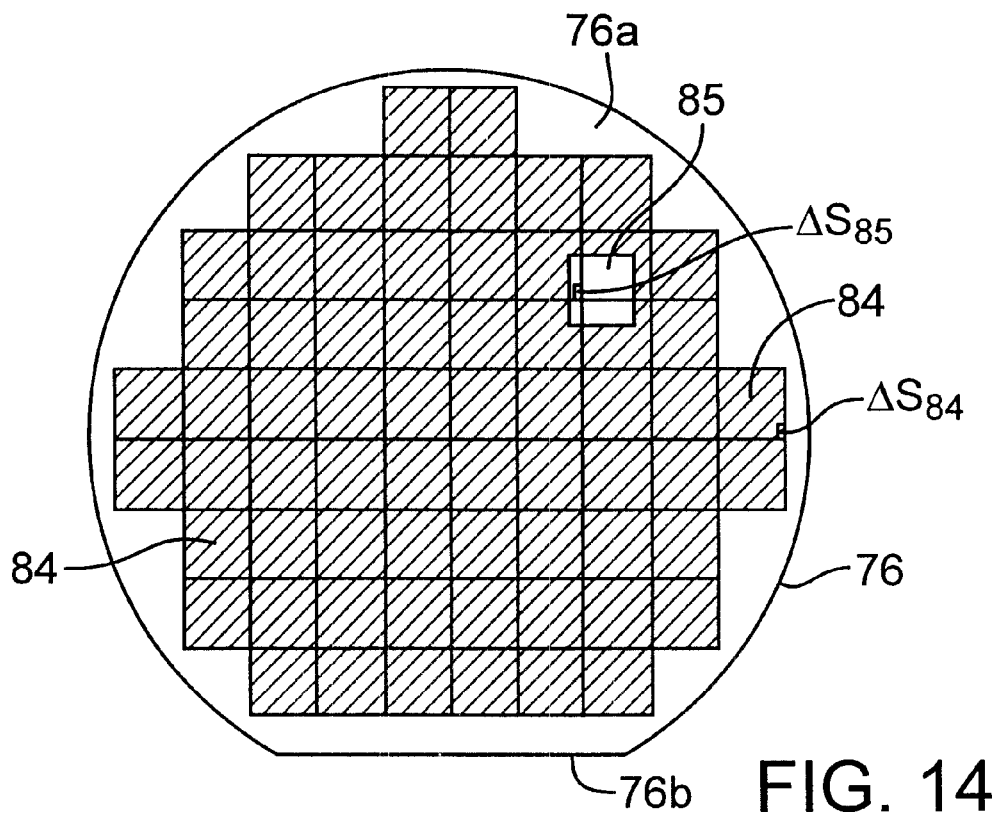
FIG. 14 depicts a representative exposure region on a patterned surface of a wafer using the FIG. 13 apparatus, as viewed in the direction represented by the arrows A—A.

FIGS. 13 and 14 depict a layer-thickness-measurement apparatus according to this example embodiment. Turning first to FIG. 13, a probe light flux 70 is produced by a fiber optic light source 71. The probe light flux 70 enters a first relay lens 72 comprising first and second lens groups 72a, 72b, respectively. A visual-field aperture 73a (defined by a plate 73) is situated between the first lens group 72a and the second lens group 72b. Thus, probe light from the fiber optic light source 71 is collimated by the first lens group 72a, clipped to an appropriately sized transverse profile by the visual-field aperture 73a, and recondensed by the second lens group 72b. A beamsplitter 74 is situated at the point of convergence of the probe light by the second lens group 72b. After passing through the beamsplitter 74 the probe light flux enters a collimator lens 75 that collimates the probe light flux a second time before the probe light impinges upon a surface 76a of a wafer 76. The surface 76a and the visual-field aperture 73a serve a dual role in relation to the second lens group 72b and the collimator lens 5; hence, the exposure region 83 of the surface 76a has a profile similar to the profile of the visual-field aperture 73a.

Light ("signal light") reflected from the patterned surface 76a of the wafer 76 returns along a portion of its incidence pathway. The signal light is reflected by the beamsplitter 74 and enters a second ("signal-light") relay lens 77 that comprises a first lens group 77a and a second lens group 77b. The signal-light relay lens 77 condenses the signal light.

Due to interaction of the probe light with minute pattern features on the surface 76a of the wafer 76, the signal light reflected from the surface 76a includes zeroth-, first-, and second-order diffraction orders of light. The zeroth-order light component is condensed by the signal-light relay lens 77 on a pinhole aperture 78a (defined by a plate 78) placed so that preferably only the zeroth-order component can pass through the pinhole aperture 78a. Zeroth-order light passing through the pinhole aperture 78a passes through a collimator lens 79 that collimates the light. The collimated light is reflected from a diffraction grating 80 that splits the light according to wavelength. Each split wavelength is condensed by a condenser lens 81 and enters a detector 82 that generates from the detected light a spectral pattern signal.

FIG. 14 shows the portion of FIG. 13 indicated by the arrow lines A—A. As can be seen, the surface 76a of the wafer 76 is divided into multiple dies 84 in each of which the same circuit pattern has been formed. An exposure region 85 on the patterned surface 76a is where the visual-field aperture 73a has imaged probe light through the second lens group 72b and the collimator lens 75. In FIG. 14, the exposure region 85 has substantially the same size and shape as a die, and has sides that are substantially parallel to corresponding edges of the dies 84. Even if the exposure region 85 should undergo a shift relative to the dies 84, the sum of the light of each wavelength entering the detector 82 would remain constant.

I.e., the same circuit pattern is inscribed in each die 84. Also, the positional relationship of the features constituting each die is the same, and the surface 76a is substantially filled with parallel dies 84. Consequently, as shown in FIG. 14, if the exposure region 85 should span several dies 84, each individual region $\Delta S_{85}$ of the exposure region 85 substantially corresponds to an individual region $\Delta S_{84}$ of a single die 84.

Even if the exposure region 85 extends outside the periphery of the patterns on the surface 76a, the same signal can be obtained. Therefore, aligning the exposure region 85 with the patterns on the surface 76a is unnecessary, and accurate signals pertaining to the thickness of the surface 76a can be obtained. Even if the wafer 76 is moving at high velocity, the entire area of the exposure region 85 will extend over at least one of the dies 84. As long as the exposure region 85 and the dies 84 are parallel to each other, a uniform signal output from the detector 82 will be obtained.

Figure 15:
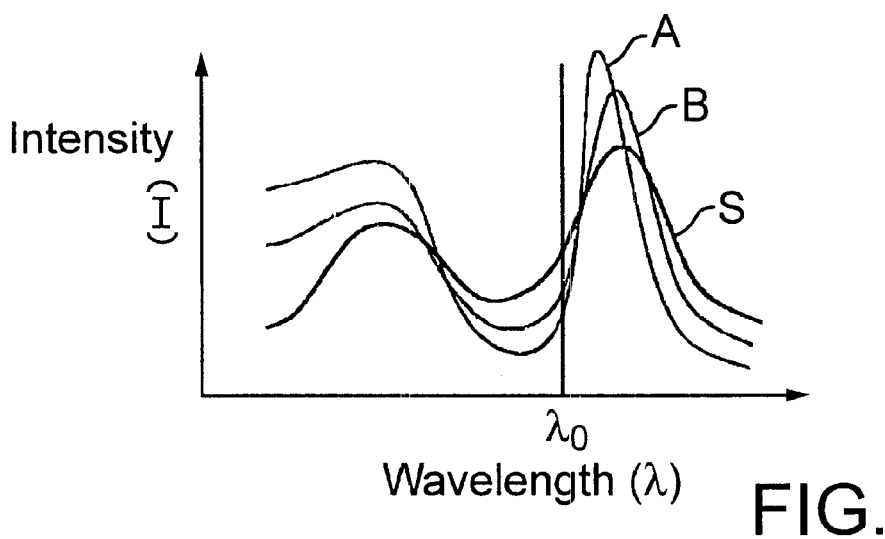
FIG. 15 is a plot of representative spectral intensity distributions obtained using the FIG. 13 apparatus with a wafer having a non-polished surface (curve "A"), a wafer having a partially polished surface (curve "B"), and a wafer having a fully polished surface (curve "S").
Figure 16:
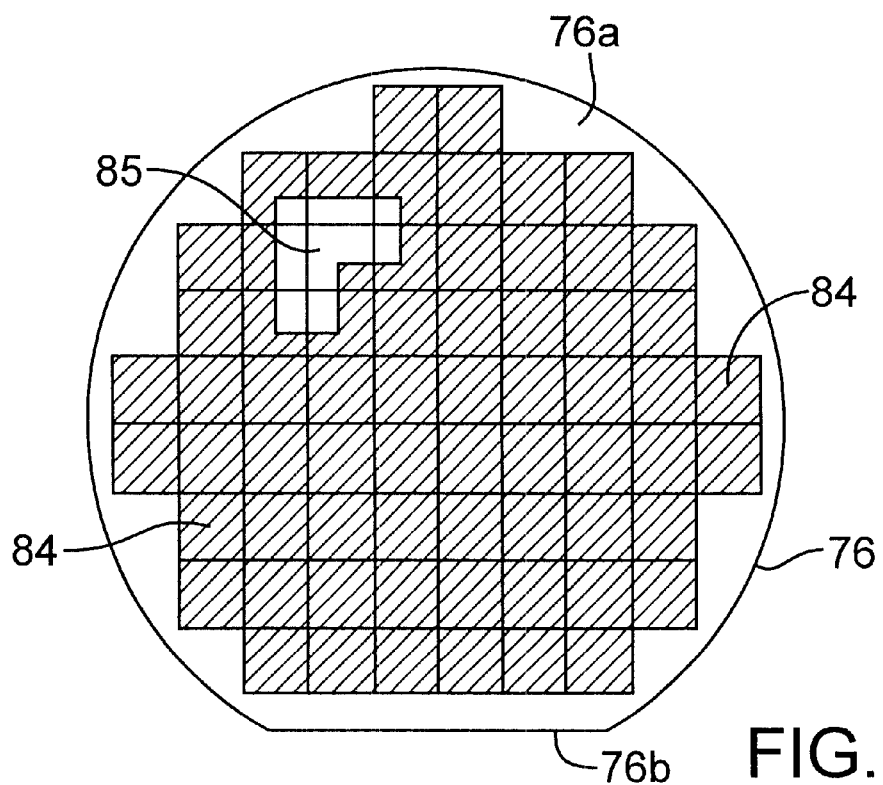
FIG. 16 depicts another representative exposure region on a patterned surface of a wafer using the FIG. 13 apparatus, as viewed in the direction represented by the arrows A—A.
Figure 17:
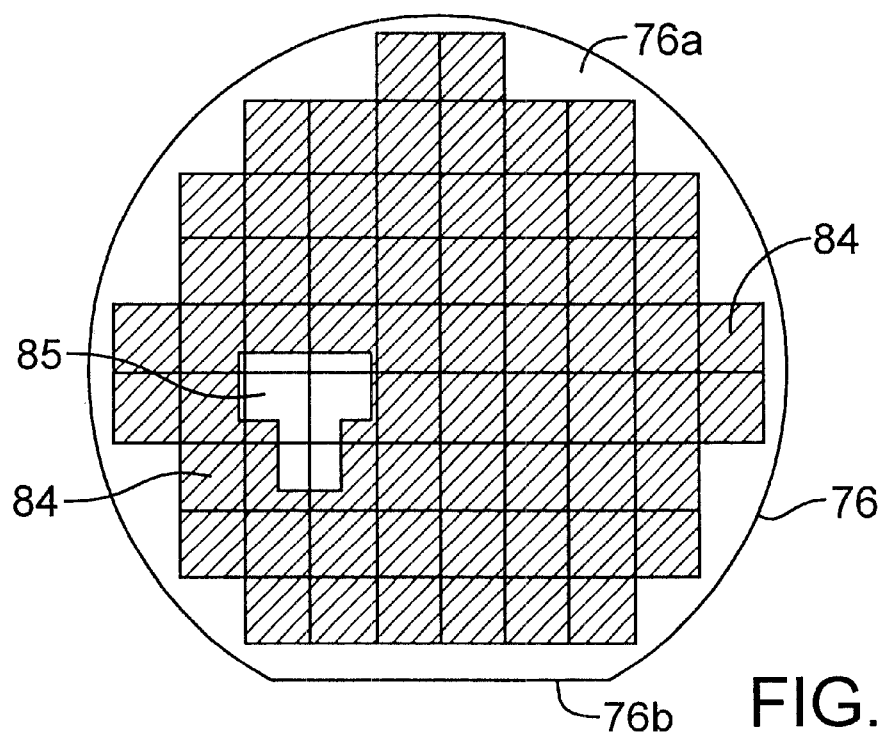
FIG. 17 depicts yet another representative exposure region on a patterned surface of a wafer using the FIG. 13 apparatus, as viewed in the direction represented by the arrows A—A.

FIG. 15 depicts representative signal plots (intensity versus wavelength) of signal light detected by the detector 82. The plot denoted "A" was obtained from a patterned wafer that was unpolished; the plot denoted "B" was obtained from a patterned wafer that was partially polished; and the plot denoted "S" was obtained from a patterned wafer that was completely planarized by polishing. It can be seen that, as the patterned surface 76a is polished, the signal-light spectrum produced by the detector 82 approaches the "S" profile at which the polishing endpoint can be readily determined.

Figure 18:
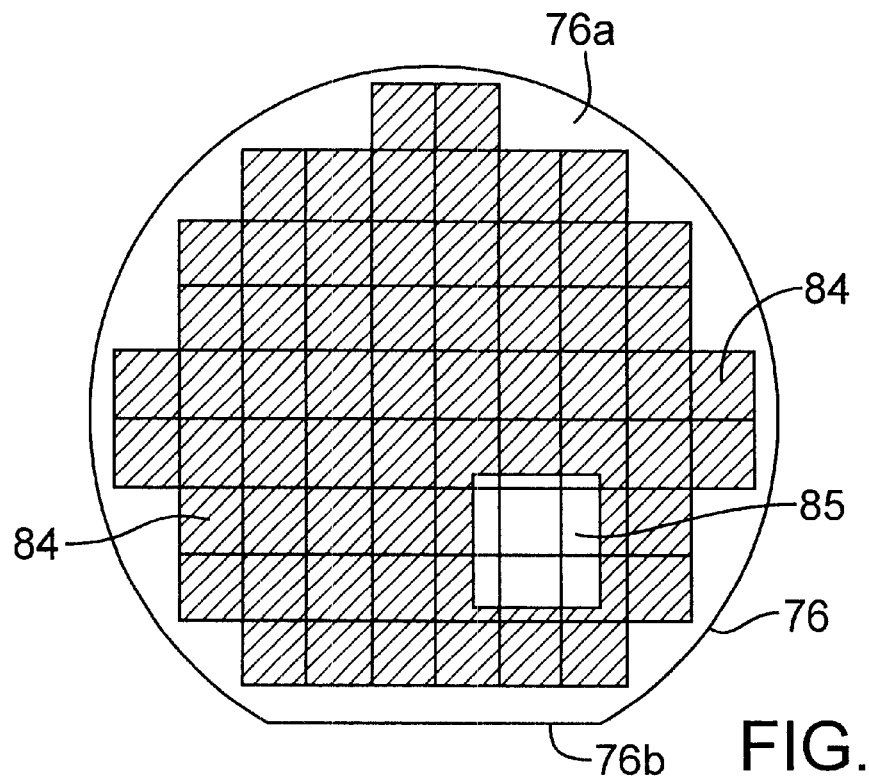
FIG. 18 depicts yet another representative exposure region on a patterned surface of a wafer using the FIG. 13 apparatus, as viewed in the direction represented by the arrows A—A.

FIGS. 16-19 depict other representative profiles of the exposure region 85. In each of FIGS. 16-17, the exposure region 85 has sides that are parallel to sides of the dies 84 and has a profile that can be formed from three complete dies. In FIG. 18, the exposure region 85 has sides that are parallel to sides of the dies 84 and has a profile that can be formed from four complete dies.

Figure 19:
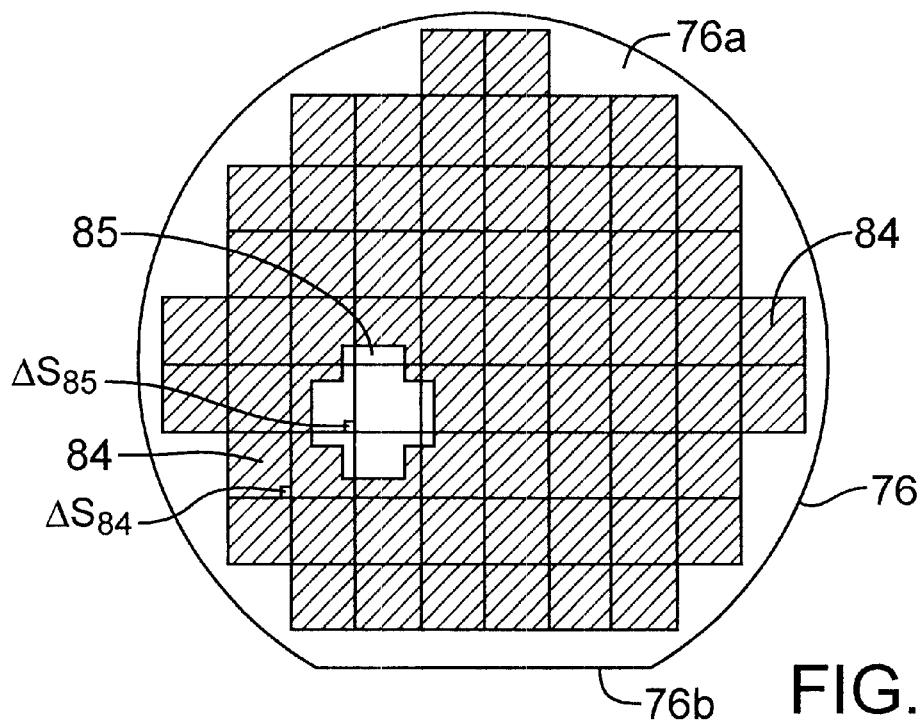
FIG. 19 depicts yet another representative exposure region on a patterned surface of a wafer using the FIG. 13 apparatus, as viewed in the direction represented by the arrows A—A.

In FIG. 19, the exposure region 85 has an area equal to that of three dies 84 and sides that are parallel to sides of the dies, but the profile cannot be formed from three complete dies. However, individual regions $\Delta S_{85}$ making up the exposure region 85 are in a parallel relationship with individual regions $\Delta S_{84}$ making up the three dies 84 to which regions $\Delta S_{84}$ the regions $\Delta S_{85}$ correspond without excess or deficiency.

With any of the exposure configurations in FIGS. 16-19, the same signal-light spectrum is obtained regardless of where the exposure region 85 is located, even if the exposure region 85 is located outside the periphery of the pattern on the patterned surface 76a. Furthermore, the surface region generating the layer-thickness signal is three to four times broader than a single die 84, thereby yielding a more stable signal.

Thus, no matter how the exposure region 85 shifts in relation to the patterned surface 76a, no change in the signal-light spectrum is manifest. However, if a portion of the exposure region 85 becomes inclined relative to a die 84 or a portion thereof, such as may occur with rotation of the wafer 76, the signal may change. To avoid such a problem, the wafer 76 can be provided with an orientation flat 76b or notch for detecting rotation and permitting correction of the errant rotation.

Figure 20:
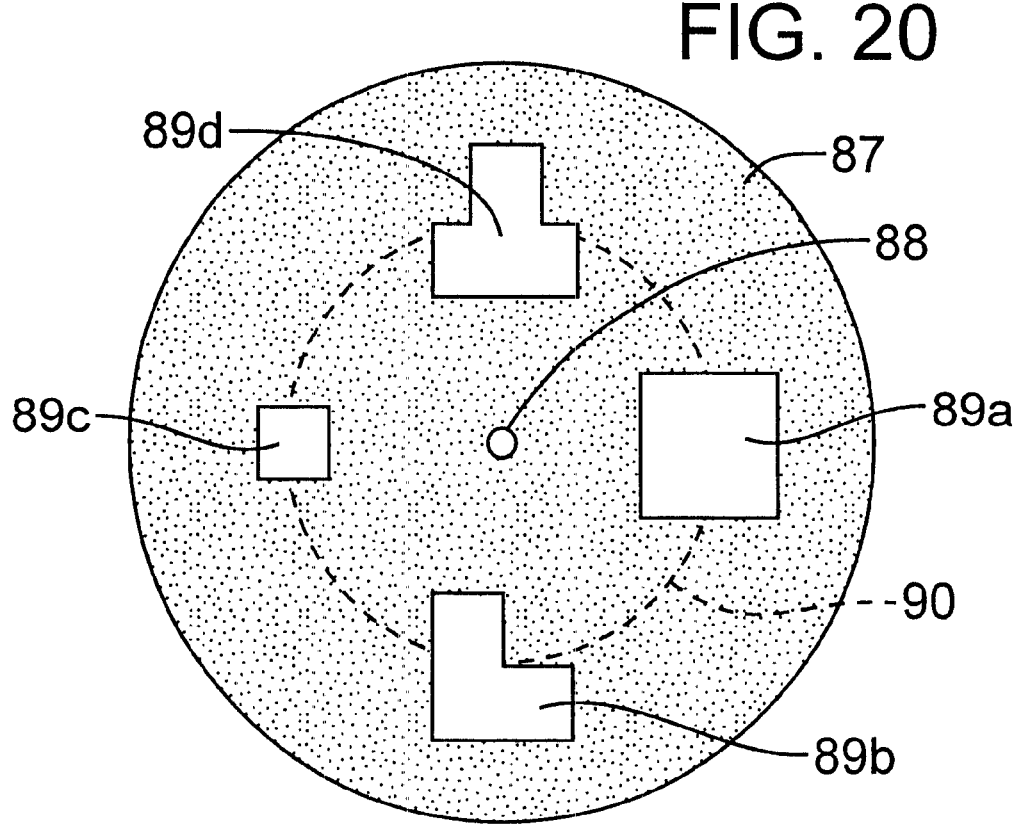
FIG. 20 depicts a first representative scheme for providing a variable visual-field aperture in the FIG. 13 apparatus.

The visual-field aperture plate 73 of FIG. 13 can be configured to provide a variable aperture 73a and thus a variable profile of the exposure region 83 on the patterned surface 76a. For example, FIG. 20 shows one possible way in which such variation can be achieved, using a rotary plate 87 with any of various selectable apertures 89a-89d. A desired visual-field aperture is selected by appropriately turning the rotary plate 87. Each of the selectable apertures 89a-89d has a center located on a circle 90 coaxial with the rotational axis 88 of the plate 87.

Figure 21:
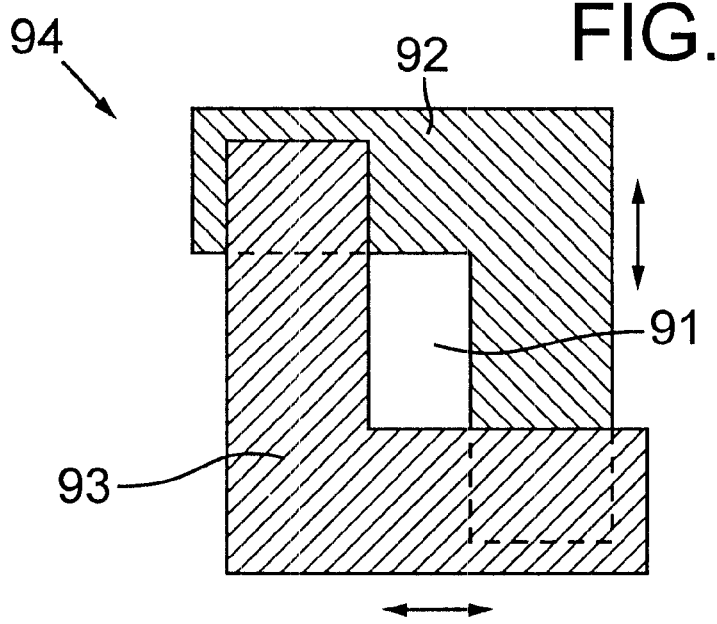
FIG. 21 depicts a second representative scheme for providing a variable visual-field aperture in the FIG. 13 apparatus.

FIG. 21 shows another possible scheme for providing a variable visual-field aperture 94. Specifically, an aperture 91 is defined by multiple plates 92, 93 (e.g., one plate 92 being stationary and the other plate 93 being movable). By moving the movable plate 93 relative to the stationary plate 92, the size of the aperture 91 can be changed as desired. Alternatively, both plates 92, 93 can be movable.

In this example embodiment, a pinhole aperture 78a is placed preferably at the focal point of the zeroth-order diffracted light passing through the signal-light relay lens 77. Alternatively, the pinhole aperture 78a can be placed at the focal point of first-order diffracted light to permit measurement of the distribution of spectral intensity of the first-order light.

If a mirror defining an aperture is placed at the focal point of the zeroth-order signal light (thereby allowing the zeroth-order light to pass through the aperture and be measured), then the first-order signal light (for example) selected from the signal light reflecting from the mirror also can be measured, thereby allowing simultaneous measurement of zeroth- and first-order light. Such a configuration allows comparisons of the zeroth-order light and the first-order light with the signal spectrum of a standard wafer, thereby providing improved measurement accuracy and precision.

In the foregoing configuration, the zeroth-order signal light was selected, using the pinhole aperture 78a, for measurement. By placing an entrance end of an optical fiber at the focal point of zeroth-order light, the zeroth-order light can be conveyed by the optical fiber to a remote location for measurement. With such a configuration, the entrance ends of respective optical fibers can be placed at the focal points of, for example, the zeroth- and first-order light, respectively, to allow comparisons of both the zeroth- and first-order signal light to be made and compared with the signal-light spectrum obtained from a standard wafer.

In this example embodiment, the probe light preferably has a uniform bandwidth for exposing the surface of the wafer. Alternatively, a monochromatic light source can be used such as a laser. To explain this using FIG. 15, the intensity of monochromatic light (of wavelength $\lambda_0$) gradually increases from the intensity exhibited by reflection from an unpolished wafer ("A") through the intensity exhibited by reflection from a partially polished wafer ("B"), to the intensity exhibited by reflection from a fully polished wafer ("S"). By observing the approach of the signal-light spectrum toward the intensity of light reflected from a fully polished wafer ("S"), the thickness of the subject layer can be determined.

Intensity-profile changes from an unpolished wafer ("A") to a fully polished wafer ("S") typically have substantially the same maxima and minima. In such cases, the approach toward the intensity exhibited by a fully polished wafer can be monitored to determine whether threshold intensity values at the maxima or minima have been exceeded, so as to determine the thickness of the patterned layer.

In this example embodiment, the intensity or the distribution of spectral intensity of the signal light flux reflected by the patterned surface of the wafer is preferably measured. However, by measuring the intensity or the distribution of the spectral intensity of probe light passing through the wafer, the thickness of the patterned layer also can be measured.

Moreover, whereas this example embodiment is particularly applicable to wafers as used in semiconductor-production processes, it will be understood that the embodiment can be applied to other processes such as production of display panels.

Example Embodiment 4

Figure 22:
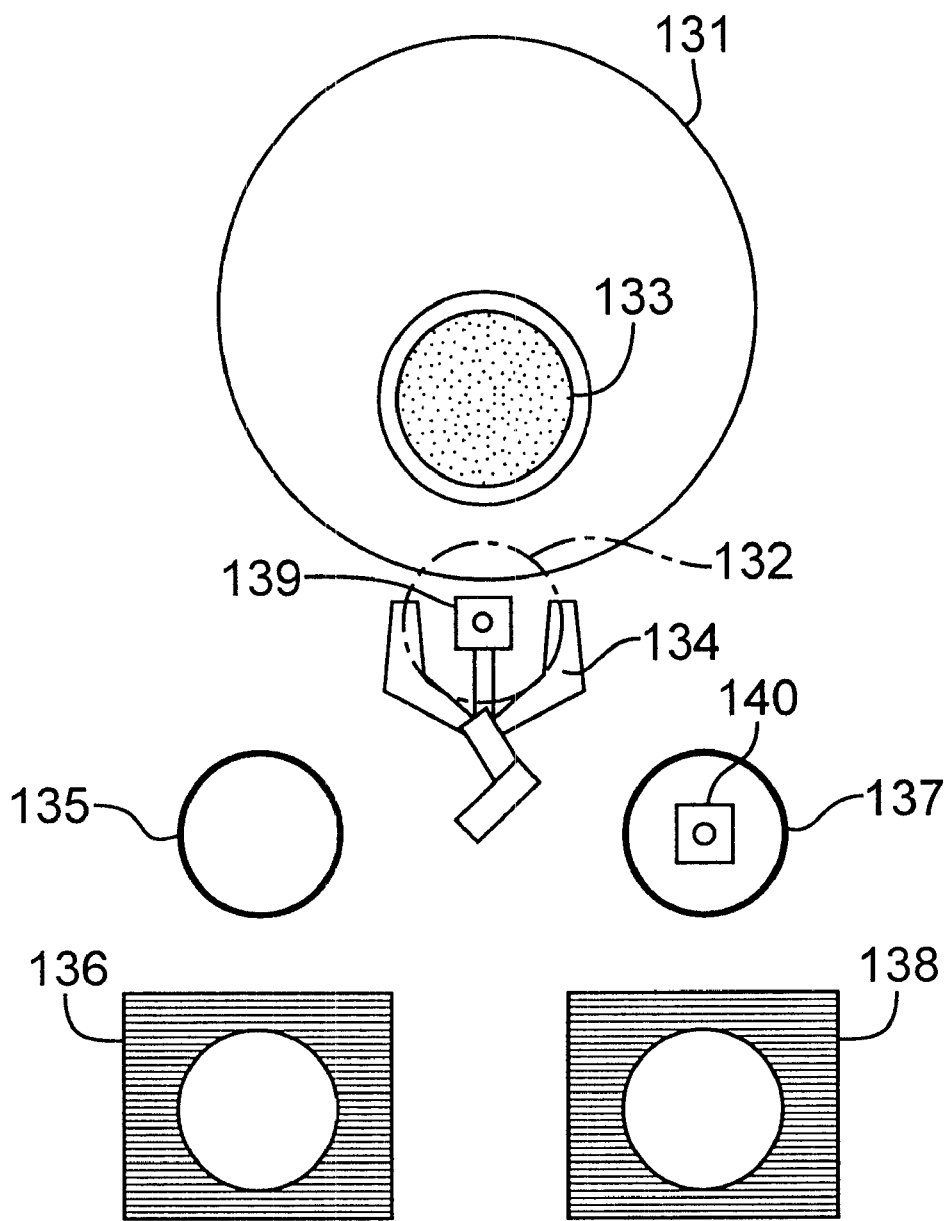
FIG. 22 depicts certain features of a polishing device according to Example Embodiment 4.

Certain aspects of this example embodiment are shown schematically in FIG. 22. The FIG. 22 apparatus includes a polishing pad 131 used to polish a wafer 132. For polishing, the wafer 132 is mounted to a polishing "head" or plate 133. A robot arm 134 is used to deliver the wafer 132 to the polishing head 133. Specifically, the robot arm 134 moves a wafer 132 from an entry-side wafer carrier 136 to an entry-side standby stage 135 to await polishing. After polishing, the wafer 132 is moved by the robot arm 134 to an exit-side standby stage 137, then to an exit-side wafer carrier 138. The FIG. 22 apparatus can include a layer-thickness measurement apparatus (also termed a polishing-extent detection apparatus) 139 attached to the robot arm 134 and/or a polishing-extent detection apparatus 140 attached to the exit-side standby stage 137. The robot arm 134 also is used to transport the wafer 132 from the entry-side standby stage 135 to the polishing head 133. After polishing, the wafer 132 is moved by the robot arm 134 from the polishing head 133 to the exit-side wafer carrier 137. With the wafer 132 mounted on the polishing head 133, wafer polishing occurs with the wafer 132 being urged by the polishing head 133 against the polishing pad 131 while the polishing pad 131 and polishing head 133 undergo relative motion.

The entry-side standby stage 135 and the entry-side wafer carrier 136 need not be separate components but can be integrated. Likewise for the exit-side standby stage 137 and exit-side wafer carrier 138.

The polishing-extent detection apparatus 139 can be used to measure the polishing endpoint (or the extent of polishing) while the robot arm 134 is situated beneath the polishing head 133 holding a completely polished wafer. Alternatively, the polishing-extent detection apparatus 139 can perform such measurements while a completely polished wafer is being transported by the robot arm 134 from the polishing head 133 to the exit-side standby stage 137.

With respect to a wafer situated at the exit-side standby stage 137 (either held in that position by the robot arm 134 or actually resting on the exit-side standby stage 137), the polishing-extent detection apparatus 140 can be used to measure the polishing endpoint (or extent of polishing) of the wafer.

Although FIG. 22 shows two polishing-extent detection apparatus 139, 140, only one is required. Both may be used if desired.

Figure 23:
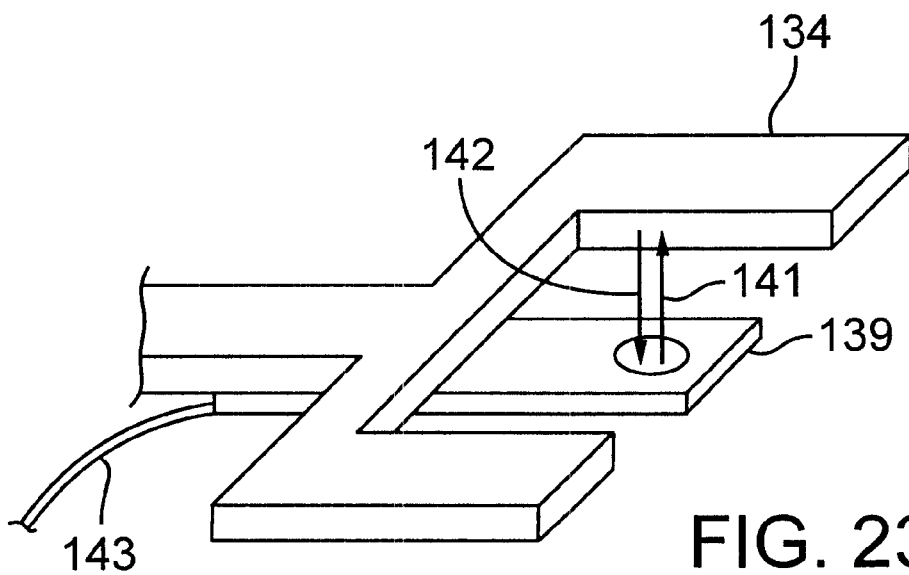
FIG. 23 is a schematic perspective view of a robot arm including a polishing-detection apparatus according to Example Embodiment 4.

FIG. 23 shows a representative scheme by which the polishing-extent detection apparatus 139 can be attached to the robot arm 134. FIG. 23 shows probe light 141 that would be incident on a wafer held by the robot arm 134, signal light 142 reflected from the wafer, and an optical fiber 143 used to conduct probe light 141 from a remote light source (not shown) to the robot arm 134 and to conduct signal light 142 from the wafer for remote detection and analysis.

Either of the polishing-extent detection apparatus 139, 140 detect the extent of polishing or the polishing endpoint by projecting probe light onto a wafer surface and then measuring the signal light, as described above, preferably by measurement of interference generated by transmission and reflection of light from thin layers on the surface of the wafer 132.

In FIG. 23, use of the optical fiber 143 reduces the mass carried by the robot arm 134. For example, all components of the polishing-extent detection apparatus 139 except light-projection optics and a detector for reflected light can be included in a remote module.

Attaching the polishing-extent detection apparatus 139 to the robot arm 134 allows the polishing endpoint (or extent of polishing) to be measured while the wafer 132 is mounted to the polishing head 133 and about to be picked up by the robot arm 134, or after the robot arm 134 has removed the wafer 132 from the polishing head 133 and is transporting the wafer 132 to the exit-side standby stage 137. The wafer 132 normally is held in the polishing head 133 by a soft, pliant, moist material called "packing film," or the polishing head 133 can include a vacuum chuck for holding the wafer 132. Layer-thickness measurements can be made at the instant the wafer 132 has been placed on the robot arm 134. (To transfer the wafer 132, either the polishing head 133 and/or the robot arm 134 can be movable.) Thus, it is possible to instantly detect insufficient polishing, perform additional polishing or change the polishing conditions for the next wafer.

It is not necessary for the wafer 132 to be stationary when performing the measurements. Performing measurements while the wafer is in motion is advantageous in reducing process time.

Figure 24:
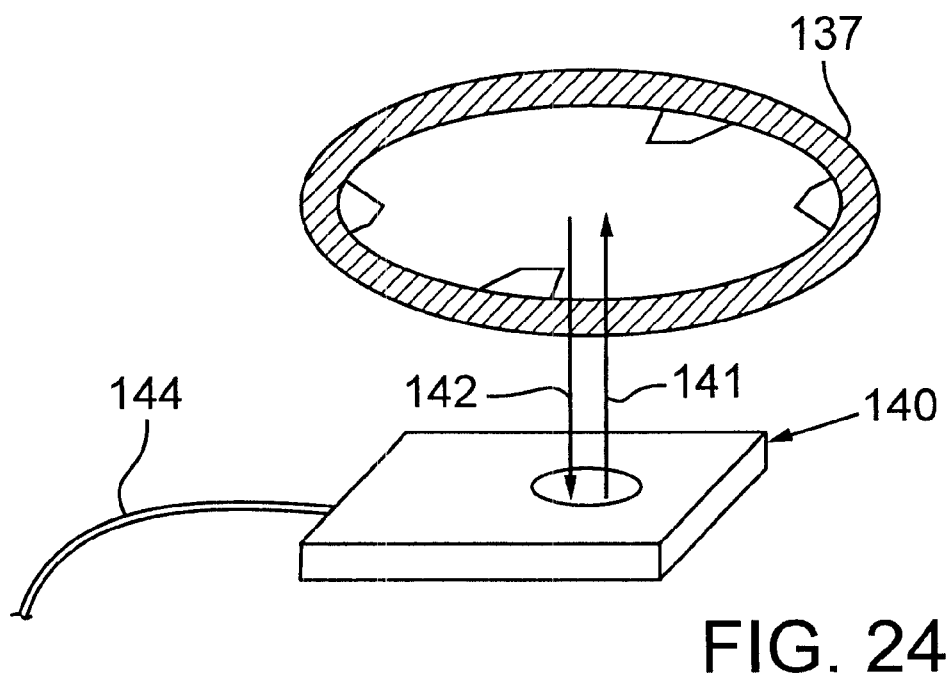
FIG. 24 depicts a representative manner in which a polishing-detection apparatus according to Example 4 can be attached to an exit-side standby stage 7.

The detection principle exploited by the polishing-extent detection apparatus 140 of FIG. 24 is similar to that employed by the FIG. 23 configuration. With respect to the FIG. 24 configuration, whenever the wafer (not shown) is placed on the exit-side standby stage 137, or whenever the wafer is situated above the exit-side standby stage 137, the polishing-extent detection apparatus 140 is in a position in which the polishing endpoint (or the extent of polishing) of the wafer can be determined.

The configuration of FIG. 24 also can be employed to obtain measurements when moving the polishing head 133 (without using a robot arm) to transport the wafer 132 from the polishing head 133 to the exit-side standby stage 137.

In FIG. 24, the polishing-extent detection apparatus 140 can be connected by an optical fiber 144 to a remote probe light source (not shown). Light reflected from the wafer 132 (held by the exit-side standby stage 137) can be detected by routing the reflected signal light through the optical fiber 144 to a remote detector (not shown). Alternatively, the probe light source and signal light detector can be located below the exit-side standby stage 137, thereby eliminating the optical fiber 144.

When measuring the polishing endpoint (or the extent of polishing), it is possible to utilize a very accurate controlled positioning mechanism for the wafer. However, accurate measurements also can be obtained using a relatively crude positioning mechanism for the wafer, thereby minimizing complexity and increasing throughput. For example, the diameter of the beam of probe light 141 impinging on the surface of the wafer can be relatively large, and the information from the wafer can be averaged.

Example Embodiment 5

This example embodiment is especially applicable with CMP apparatus having a movable polishing head used for moving the wafer to and from a polishing head and a standby stage, for example. Hence, a robot arm as used in Example Embodiment 4 is not required. A representative polishing-extent detection sequence is shown in FIGS. 26(a)-26(c).

Figure 26A:
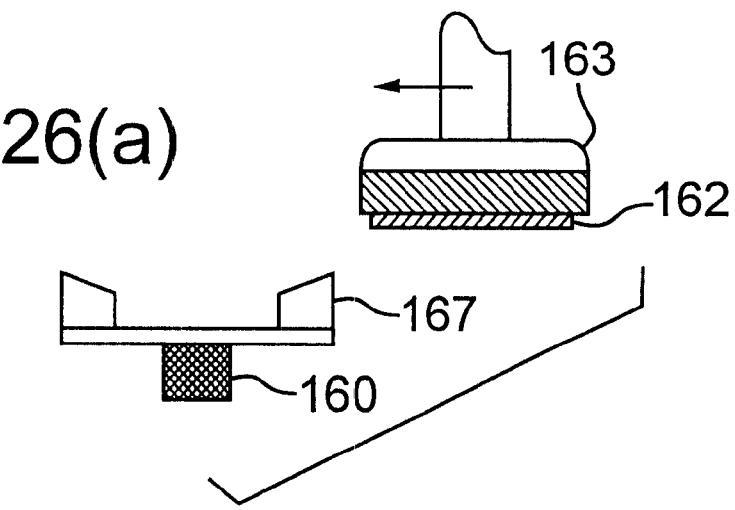
FIGS. 26(a)-26(c) depict representative steps in a process for measuring layer thickness, according to Example Embodiment 5.
Figure 26B:
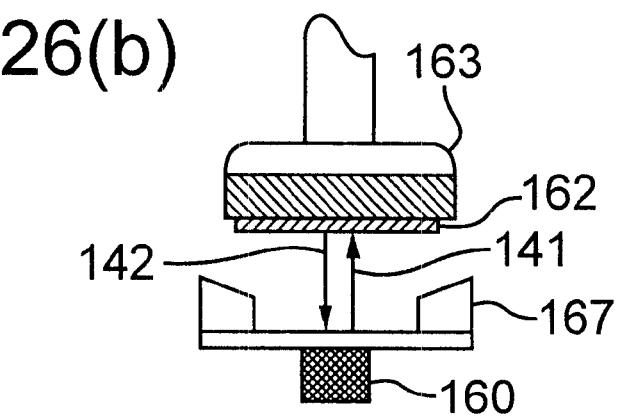
Figure 26C:
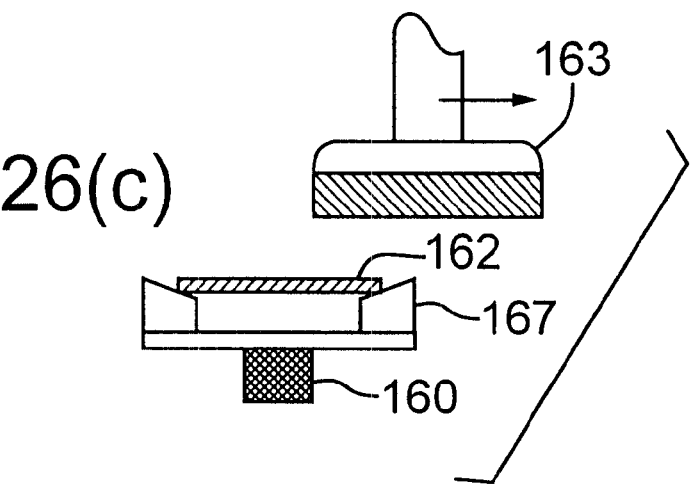

At the end of polishing, the polishing head 163 is moved until it is situated above the exit-side standby stage 167 (FIG. 26(a)). Detection of the polishing endpoint (or extend of polishing) can be performed after the wafer 162 has been placed by the polishing head 163 on the exit-side standby stage 167. Alternatively, detection of the polishing endpoint (or extent of polishing) can be performed while the wafer 162 is being held on the polishing head 163 using a polishing-extent detection apparatus 160 mounted in the exit-side standby stage 167 (FIG. 26(b)).

As described above, the polishing-extent detection apparatus 160 performs measurements of the remaining layer thickness from the spectral characteristics of the signal light 142. If the measurement results indicate that the polishing endpoint has been reached then the polishing head 163 descends so as to place the wafer 162 on the exit-side standby stage 167 (FIG. 26(c)). If the measurement results indicate that a polishing endpoint has not yet been reached, then the polishing head 163 (still holding the wafer 162) returns the wafer 162 to a position for further polishing.

Working Example 1

Using the polishing system as shown in FIG. 4, an $SiO_2$ interlayer insulating layer of an imaging-element on a 6-inch wafer 1 was polished while detecting the polishing endpoint. The imaging element had a minimum periodic structure of approximately $(10\,\mu m)^2$ (i.e., $10\,\mu m \times 10\,\mu m$). The polishing pad 4 comprised an epoxide polishing fabric. To expose the wafer 1 to probe light PL, a round hole approximately 2 cm in diameter was bored into the polishing pad 4 and the polishing plate 133. A quartz window 5 was installed as shown in FIG. 4.

Probe light PL from the probe light source 6 was directed by an optical system as shown in FIG. 5 perpendicularly onto the surface of the wafer 1. From the signal light reflected from the wafer surface, scattered light and diffracted light were removed by passage of the signal light through the pinhole aperture 17a. The diffraction grating 19 split the signal light according to wavelength such that light having different wavelengths propagated in different directions. The diffracted signal light was detected by the linear sensor 20 (a 50-element photodiode). The range of measured wavelengths was approximately 400 nm to 800 nm and the diameter of the signal-light beam impinging upon the diffraction grating 19 was approximately 2 mm. The output from the sensor 20 was electrically amplified and processed by the computer 7. Data regarding the spectral intensity of the probe light PL from the light source 6 was determined in advance and used as a coefficient during processing of the data from the sensor 20.

The polishing slurry comprised silica granules dispersed in an alkaline solvent. Polishing was performed at a polishing pressure of about 100 g/cm$^2$.

The presence of the slurry on the wafer imparted a light loss (due principally to scattering) of no greater than 1 percent.

Figure 9:
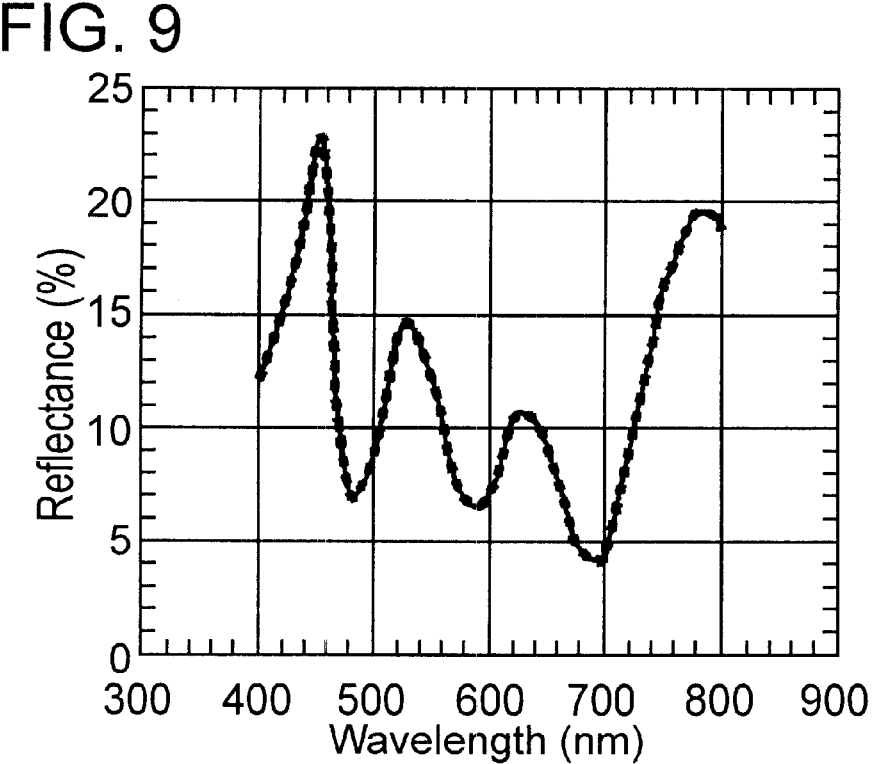
FIG. 9 is a plot of a representative waveform obtained prior to reaching the polishing endpoint in Working Example 1.

In observing the spectral reflectance of the probe light PL (as signal light) from the wafer 1, a stable spectral distribution ("waveform") such as that shown in FIG. 9 was obtained. Essentially no change in the waveform was observed when the impingement position of the probe light on the wafer was moved from a first region containing circuit features to a second region containing circuit features. FIG. 9 actually comprises two plots substantially superimposed on each other (one as a solid line, the other as a dashed line, each representing impingement of the probe light on a different feature-containing region of the wafer). Whenever the probe-light impingement position was changed from a feature-containing region to a region lacking circuit features (e.g., a region near a perimeter of a die called the scribe line or a region outside any of the dies near the edge of the wafer), the waveform changed dramatically and the absolute value of the reflectance was increased about two-fold.

In this working example, an algorithm was used that blocked processing of a signal from the detector whenever the intensity of detected light of a specific wavelength reached or exceeded a preset level. Thus, any possible adverse effect of light reflecting from regions of the wafer lacking circuit features was eliminated.

Figure 10:
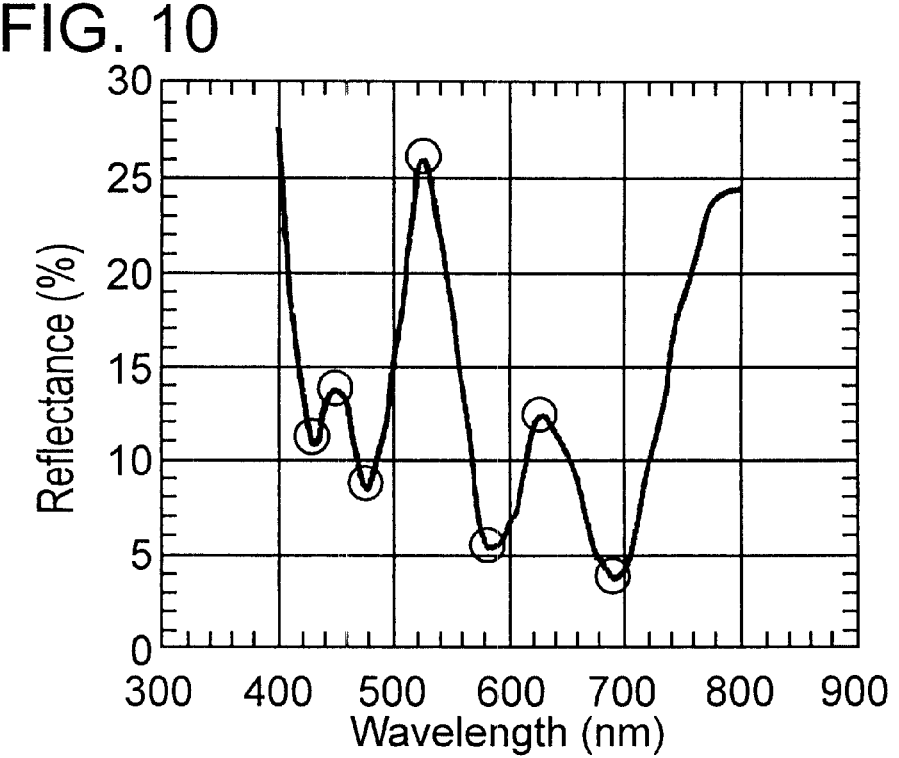
FIG. 10 is a plot of a representative waveform obtained at the polishing endpoint in Working Example 1.

An SiO$_2$ insulating layer of approximately 400 nm was formed on the outermost surface of each of multiple wafers using chemical vapor deposition (CVD). The wafers were polished individually to a polishing endpoint thickness of approximately 150 nm. (Initially, a dummy wafer was polished to a specific polishing- endpoint; a detected spectral distribution as shown in FIG. 10 was obtained, and the maxima and minima, indicated by circles, determined using a peak-search program.)

Actual polishing of the wafers was performed while receiving signals from the detector 20. Polishing was terminated when the maxima and minima (circles) of the detected spectral distribution substantially matched corresponding loci on the spectral distribution obtained using the dummy wafer.

Inspection of the wafers that had been polished revealed that the polished surface of each had been satisfactorily planarized and the target polishing thickness had been achieved within an error of approximately 10 percent.

Working Example 2

In this working example, similar measurements were performed as in Working Example 1. The spectral characteristics of the reflected probe light (i.e., signal light) at the polishing endpoint were calculated in advance. Comparisons were made of the calculated and measured minima and maxima in the spectral distribution. Whereas the absolute value of the spectral distribution did not match that of the calculated reflected-light spectral distribution, there was an excellent match of the locations of the minima and maxima of each spectrum. By using such a basis for determining polishing endpoint (i.e., using calculated minima and maxima), polishing endpoints were determined with a film-thickness precision of about 10 percent.

Working Example 3

Figure 11:
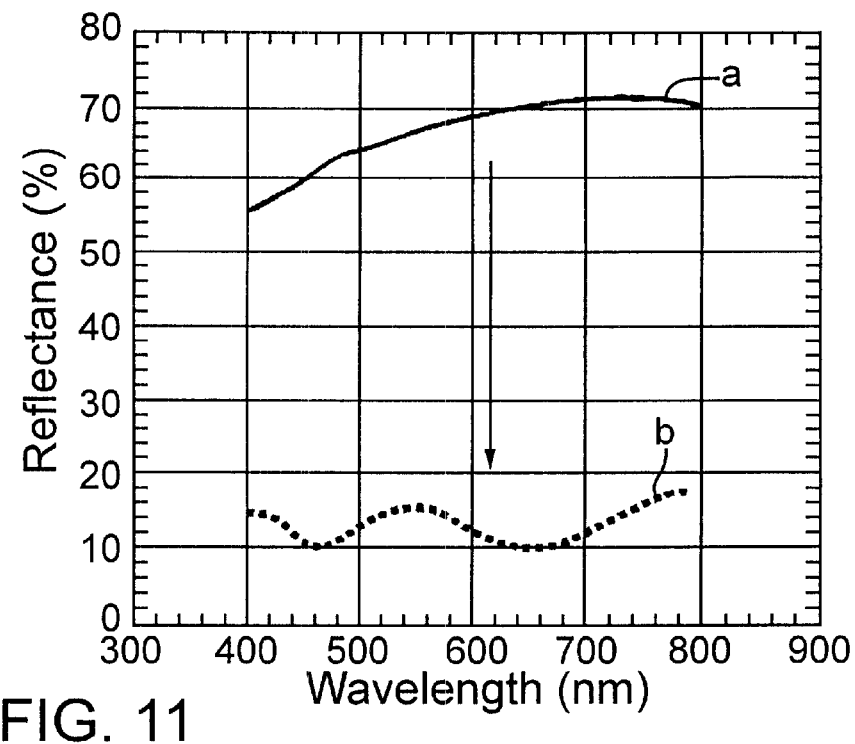
FIG. 11 is a plot of representative waveforms at the polishing endpoint and while polishing is still progressing through a metallic layer, as described in Working Example 3.

This working example was performed using the same configuration and layout as Working Example 1. The entire surface of a silicon wafer was covered with an insulating layer and then a metal layer (Al) before beginning polishing. Probe light reflected (as signal light) from such a surface revealed an essentially flat spectrum as shown in FIG. 11 (curve a). As polishing progressed through the metal layer and the underlying insulating layer was exposed at certain locations on the surface, the absolute value of the amount of reflected signal light (curve b) declined relative to the curve a. Also, the spectrum b revealed minima and maxima caused by interference. Polishing was terminated when the waveform b appeared in stable form. Endpoint detections of about 300 nm were realized with a precision of approximately 10 percent.

Working Example 4

Figure 12:
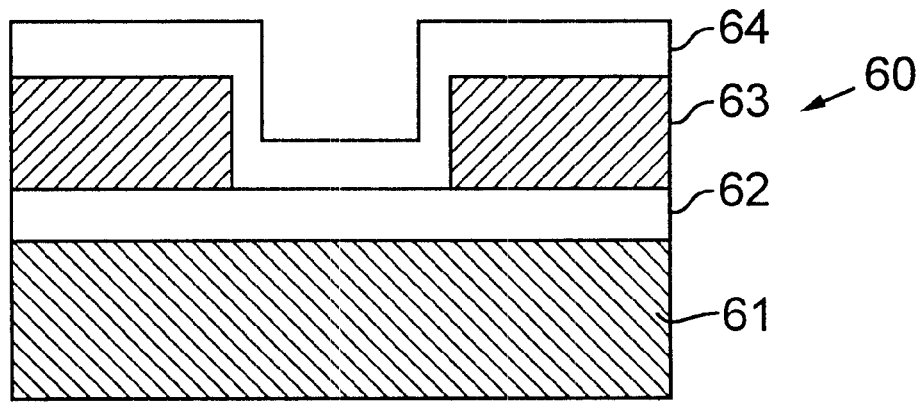
FIG. 12 is an elevational sectional view of the sample wafer used in Working Example 4.

A wafer 60 like the one shown in FIG. 12 was fabricated and measured in this working example. A Si substrate 61 was heated and coated with a 573-nm thick SiO$_2$ "heat oxide" layer 62. An aluminum layer (700 nm thick) was formed on the surface of the SiO$_2$ layer 62. Then, a layer of photoresist was applied. The photoresist was exposed using a photomask, the aluminum was etched, and the photoresist was removed to form metal features 63. A layer 64 of SiO$_2$ (390 nm thick) was then applied using plasma CVD. In the finished wafer 60 (FIG. 12) the metal features 63 had a pitch of 1 μm.

Probe light was directed to impinge upon the wafer 60 from above (i.e., on the layer 64) at an angle of incidence using an optical system as shown in FIG. 7. The luminous intensity of probe light reflected (as signal light) from the surface of the wafer 60 (wafer denoted as item 47 in FIG. 7) was detected and measured using a detector. During measurements, the detector was moved by the goniometer 46, simultaneously with changing the impingement location of the probe light on the wafer 60 so that the signal light reflected from the surface of the wafer 60 could continue to be detected.

As the angle of incidence of the probe light was changed (using the goniometer 46), the spectrum of probe light exhibited various changes. For example, whenever the incidence angle was small (<35°), the obtained spectrum of the signal light was complex and significantly different from the spectrum obtained from a planar layered film. However, whenever the incidence angle was 35° or more, less signal light was detected, but the spectrum of the signal light was the same as that obtained from a planar structure comprising a Si substrate, an SiO$_2$ "heat oxide" layer (573 nm), an aluminum layer (700 nm), and an SiO$_2$ layer (390 nm) That is, by directing the probe light to impinge upon the wafer 60 at a substantial angle, the spectrum of signal light obtained when the probe light reflected from a region of the wafer lacking surficial irregularities was observed to have the same spectrum as probe light reflected from a region of the wafer having such surficial irregularities.

Working Example 5

This working example was directed to detecting a polishing endpoint of a silicon wafer being fabricated using CMP. The wafer included an $SiO_2$ interlayer insulating layer and was destined to be made into an image pick-up device. The wafer diameter was 6 inches. Polishing was performed while the wafer was secured to a polishing head using packing film. During polishing, the polishing head was both rotated and moved in a reciprocating manner across the surface of a foam polishing pad 600 mm in diameter. The polishing slurry consisted of silica granules dispersed in an alkali medium. The polishing pressure was about 200 $g/cm^2$.

Figure 25A:
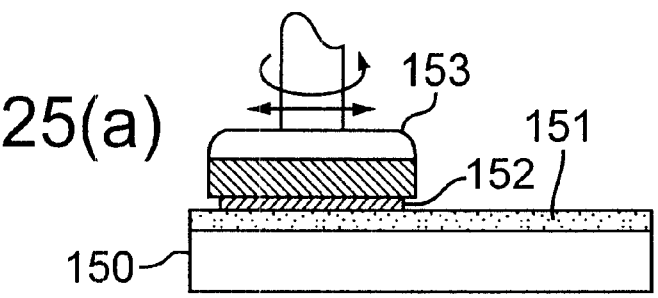
FIGS. 25(a)-25(c) depict representative steps in a process for measuring layer thickness, according to Example Embodiment 4.
Figure 25B:
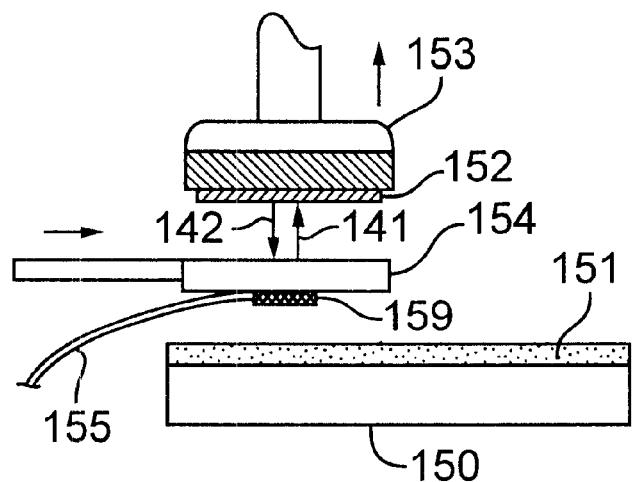
Figure 25C:
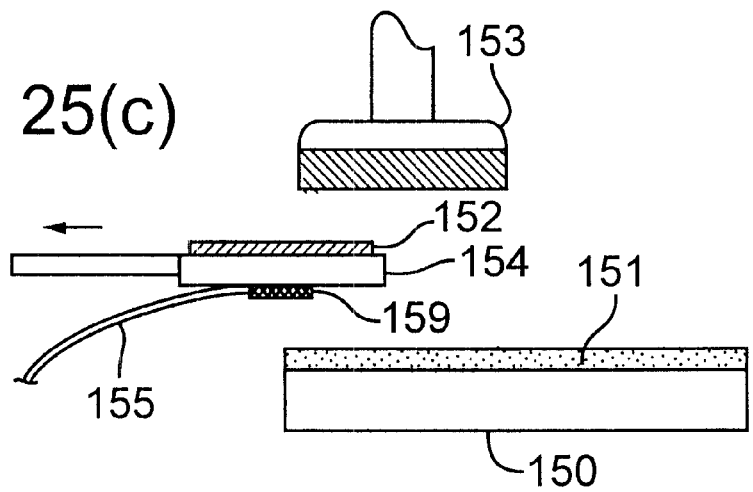

Detection of polishing endpoint was performed in a manner as diagrammed in FIGS. 25(a)-25(c), showing a polishing plate 150, a polishing pad 151, a wafer 152, and a polishing head 153.

When polishing stopped (FIG. 25(a)), the polishing head 153 moved away (upward in the figure) from the polishing pad 151. A robot arm 154 moved into position between the polishing head 153 and the polishing pad 151. The robot arm 154 included a polishing-extent detection apparatus 159. A probe light 141 (conducted from a remote source, not shown, through an optical fiber 155) was directed at the surface of the wafer 152 from the polishing-extent detection apparatus 159. Signal light 142 reflected from the wafer 152 was detected by a detector in the polishing-extent detection apparatus 159 (FIG. 25(b)), wherein the thickness of the residuum of the layer being polished was determined from the spectral characteristics of the signal light 142.

Specifically, the probe light 141 was white light produced by a xenon lamp. The signal light 142 passed through a pinhole aperture (not shown) and split into separate wavelengths (traveling in different directions) by reflection from a diffraction lattice (not shown). The spectral characteristics of the signal light 142 were measured using an optical system comprising a 50-element light-diode linear sensor (not shown).

If the measurement indicated that the polishing endpoint had been reached then the robot arm 154 received the wafer 152 from the polishing head 153 and transferred the wafer to a standby stage (not shown) for downstream processing (FIG. 25(c)).

If the measurement indicated that more polishing of the wafer 152 was required to reach the polishing endpoint, then the polishing head 153 descended and resumed polishing of the wafer. Data with respect to the elapsed polishing time for the wafer 152 were stored in a memory to determine expected duration of polishing for the subsequent wafer. (Eventual deterioration of the polishing pad 151 requires that polishing time increase with further use of the polishing pad.) Monitoring polishing time of a series of wafers in this way allowed an accurate assessment of when to change the polishing pad 151.

Whereas the invention has been described in connection with multiple example embodiments, it will be appreciated that the invention is not limited to those example embodiments. On the contrary, the invention is intended to encompass all modifications, alternatives, and equivalents as may be included within the spirit and scope of the invention as defined by the appended claims.

What is claimed is:

1. An apparatus for measuring thickness of a patterned layer on a workpiece comprising a planar substrate to which the patterned layer has been applied, the patterned layer being subjectable to a process that causes a time-varying change in the thickness and/or planarity of the patterned layer, the apparatus comprising:
   (a) a probe light source that produces a beam of probe light having multiple wavelengths and a transverse area larger than an area of a unit cell on the patterned layer and that directs the beam to be incident on selected pattern features of the patterned layer and produces a signal light from reflection of the probe light from the patterned layer or transmission of the probe light through the patterned layer by interaction of probe light with the selected pattern features of the patterned layer;
   (b) a light detector situated so as to receive and detect multiple wavelengths of the signal light and produce a corresponding electronic signal encoding data regarding intensity at various wavelengths of the detected signal light; and
   (c) a processor connected to the light detector, the processor being configured to calculate, from the electronic signal, a spectrum of intensity versus wavelength based on the reflection or transmission of the probe light by the selected pattern features, the intensity spectrum providing data indicating the thickness and/or planarity of the patterned layer based on a comparison of the spectrum of intensity and a reference spectrum of intensity based on reflection or transmission from pattern features of a reference patterned layer corresponding to the selected pattern features.

2. The apparatus of claim 1, further comprising an aperture situated between the light detector and the patterned layer, the aperture being operable to select at least one predetermined diffraction order produced by the reflection or transmission of the probe light for delivery to the light detector.

3. An apparatus for measuring thickness of a patterned layer on a workpiece comprising a planar substrate to which the patterned layer has been applied, the patterned layer being subjectable to a process that causes a time-varying change in the thickness and/or planarity of the patterned layer, the apparatus comprising:
   (a) a probe light source that produces a beam of white probe light having a transverse area larger than an area of a unit cell on the patterned layer and that directs the beam to be incident on the patterned layer and produce a signal light by reflection of the probe light from, or transmission of the probe light through selected pattern features in patterned regions of the patterned layer;
   (b) a light detector situated so as to receive and detect multiple wavelengths of the signal light and produce a corresponding electronic signal encoding data regarding intensity at various wavelengths of the detected signal light; and
   (c) a processor connected to the light detector, the processor being configured to calculate, from the electronic signal, a spectrum of intensity versus wavelength based on the reflection or transmission of the probe light by the selected pattern features of the pattern layer, the intensity spectrum providing data indicating the thickness and/or planarity of the patterned layer based on a comparison of the spectrum of intensity and a reference spectrum of intensity.

4. The apparatus of claim 3, further comprising:
first, second, third, fourth, and fifth lenses, the first, second, and third lenses being situated between the probe light source and the workpiece so as to refract the probe light propagating from the probe light source to the workpiece, and the fourth and fifth lenses being situated between the workpiece and the light detector so as to refract the signal light propagating from the workpiece to the detector;
a beamsplitter located between the second and third lenses, wherein probe light propagating from the second lens passes through the beamsplitter, and signal light propagating from the workpiece through the third lens is reflected by the beamsplitter to the fourth and fifth lenses; and a diffraction grating situated between the fifth lens and the light detector.

5. The apparatus of claim 4, further comprising:

a beam-clipping aperture situated between the second and third lenses; and a pinhole aperture situated between the fourth and fifth lenses.

6. The apparatus of claim 3, wherein dispersed and diffracted light is produced by the reflection of the probe light from or transmission of the probe light through the patterned layer and further comprising an aperture situated and configured to remove the dispersed and diffracted light from the signal light.

7. An apparatus for measuring the extent of surficial polish of a patterned layer on a workpiece comprising a planar wafer on which the patterned layer has been applied, the apparatus comprising:

(a) a polishing assembly operable to hold the workpiece and subject the patterned layer to polishing that removes at least portions of the patterned layer as the patterned layer is surficially planarized by the polishing; and (b) a polishing-extent measuring assembly, comprising (i) a probe light source that produces a beam of probe light having multiple wavelengths and a transverse area larger than an area of a unit cell on the patterned layer and that directs the beam of the probe light to be incident on a patterned region of the patterned layer; (ii) a light detector situated so as to receive and detect signal light produced by either transmission of probe light through or reflection of probe light from the patterned region of the patterned layer, wherein the signal light is produced by interaction of probe light with multiple layers in patterned regions of the patterned layer detector is operable to detect multiple wavelengths of the signal light and produce an electronic signal including data regarding light intensity at various wavelengths of detected signal light; and (iii) a processor connected to the light detector, the processor being configured to calculate, from the electronic signal, a spectrum of intensity or transmittance, respectively, versus wavelength based on the interaction, the intensity spectrum providing data indicating the extent of polishing of the patterned layer.

8. The apparatus of claim 7, wherein the polishing assembly comprises:

a wafer carrier that holds the wafer during polishing; and a polishing plate to which a polishing pad can be mounted, the polishing plate and pad defining a window transmissive to the probe light so as to allow the probe light to pass through the window to the patterned surface as the patterned surface is being polished by the polishing pad.

9. The apparatus of claim 7, wherein the processor calculates a spectrum, whenever the probe light reflects from or passes through the patterned region, exhibiting at least one maximum or minimum.

10. The apparatus of claim 9 wherein the processor monitors at least one of the following in determining the extent of polishing of the patterned layer:

an appearance or disappearance of a maximum or minimum in the spectrum, a change in a wavelength at which a maximum or minimum is located on the spectrum, and a change in an intensity at a particular wavelength at which a maximum or minimum is located on the spectrum.

11. The apparatus of claim 7, wherein the polishing assembly comprises:

a wafer carrier that holds the wafer during polishing; and a polishing plate to which a polishing pad can be mounted, the wafer carrier being operable to urge the patterned surface against the polishing pad for polishing the patterned surface.

12. The apparatus of claim 11, wherein, during polishing, a portion of the wafer extends beyond an edge of the polishing pad, the probe light being incident on the portion of the wafer extending beyond the edge.

13. The apparatus of claim 7, wherein the light detector comprises a filter operable to select at least one specific wavelength of the signal light for detection.

14. The apparatus of claim 7, further comprising a robot arm operable to convey the workpiece from an entry-side standby position to the polishing assembly for polishing and from the polishing assembly to an exit-side standby position to await downstream processing.

15. The apparatus of claim 14, wherein the polishing-extent measuring assembly is incorporated in the robot arm to permit a determination of the extent of polishing of the patterned layer to be made either as the robot arm is transporting the workpiece or when the robot arm has placed the workpiece on the polishing assembly.

16. The apparatus of claim 14, further comprising an exit-side standby stage located at the exit-side standby position, wherein the polishing-extent measuring assembly is incorporated in the exit-side standby stage.

17. The apparatus of claim 14, wherein the polishing assembly comprises:

a wafer carrier that holds the workpiece during polishing; and a polishing plate to which a polishing pad can be mounted, the wafer carrier being operable to urge the patterned surface of the workpiece against the polishing pad for polishing the patterned surface, the polishing-extent measuring assembly being operable to measure extent of polishing of the patterned surface while the workpiece is being held by the wafer carrier.

18. The apparatus of claim 17, wherein the processor is operable to modify a condition of polishing of the patterned layer in response to a particular extent of polishing of the patterned layer as determined by the polishing-extent measuring assembly.

19. The apparatus of claim 7, wherein dispersed and diffracted light is produced by the reflection of the probe light from or transmission of the probe light through the patterned layer and further comprising an aperture situated and configured to remove the dispersed and diffracted light from the signal light.

20. The apparatus of claim 19, wherein the processor calculates a spectrum, whenever the probe light reflects from or passes through the patterned region, exhibiting at least one maximum or minimum.

21. The apparatus of claim 20, wherein the processor monitors at least one of the following in determining the extent of surficial polish of the patterned layer:

an appearance or disappearance of a maximum or minimum in the spectrum;

a change in a wavelength at which a maximum or minimum is located on the spectrum; and a change in an intensity at a wavelength associated with a maximum or minimum in the spectrum.

22. The apparatus of claim 19, wherein the polishing-extent measuring assembly detects a polishing endpoint by comparing an actually measured spectrum with a previously obtained reflectance spectrum or transmittance spectrum, wherein the previously obtained spectrum is based on the interaction of the probe light.

23. The apparatus of claim 22 wherein the light detector and processor are operable to determine the extent of polishing whenever the probe light is incident on the patterned region.

24. The apparatus of claim 19, wherein the beam of probe light produced by the probe light source has a transverse area larger than an area of a die on the patterned layer.

25. The apparatus of claim 19, wherein the light detector comprises a filter operable to select at least one specific wavelength of the signal light for detection.

26. An apparatus for measuring the extent of surficial polish of a patterned layer on a workpiece comprising a planar wafer on which the patterned layer has been applied, the apparatus comprising:
 (a) a polishing assembly operable to hold the workpiece and subject the patterned layer to polishing that removes at least portions of the patterned layer as the patterned layer is surficially planarized by the polishing; and
 (b) a polishing-extent measuring assembly, comprising (i) a probe light source that produces a beam of probe light having multiple wavelengths and that directs the beam of the probe light to be incident on a patterned region of the patterned layer; (ii) a light detector situated so as to receive and detect signal light produced by either transmission of probe light through or reflection of probe light from the patterned region of the patterned layer, wherein the signal light is produced by interaction of probe light with selected pattern features in patterned regions of the patterned layer and the light detector is operable to detect multiple wavelengths of the signal light and produce an electronic signal including data regarding light intensity at various wavelengths of detected signal light, and (iii) a processor connected to the light detector, the processor being configured to calculate, from the electronic signal, a spectrum of intensity or transmittance, respectively, versus wavelength based on the interaction, the intensity spectrum providing data indicating the extent of polishing of the patterned layer, wherein the polishing-extent measuring assembly detects a polishing endpoint by comparing an actually measured spectrum with a previously obtained reflectance spectrum or transmittance spectrum, wherein the previously obtained spectrum is based on the interaction.

27. The apparatus of claim 26, wherein the light detector and processor are operable to determine the extent of polishing whenever the probe light is incident on the patterned region.

28. The apparatus of claim 26, further comprising an aperture situated and configured to remove dispersed and diffracted light from the signal light.

29. An apparatus for measuring the thickness of a patterned surface layer on a semiconductor wafer, the patterned surface layer comprising multiple dies each defining a circuit pattern for a semiconductor device, the apparatus comprising:
 (a) a probe-light optical system that comprises an adjustable visual-field aperture, the probe light optical system being operable to direct a probe light flux having multiple wavelengths at the patterned surface layer and to adjust a transverse profile of the probe light flux by clipping with the adjustable visual-field aperture such that the probe light flux, when incident on the patterned surface layer, illuminates an area on the patterned surface layer equal in area to an integral multiple of one die and having sides parallel to the die, the probe light being either transmitted by or reflected from the illuminated area so as to produce a corresponding signal light exhibiting interaction of probe light with selected pattern features in patterned regions of the patterned surface layer;
 (b) a light detector for receiving the signal light, the light detector measuring a characteristic of the interaction of the signal light with the selected pattern features, and producing from the received signal light a corresponding electrical signal having a characteristic indicative of the thickness of the patterned surface layer; and
 (c) an optical element situated between the light detector and the patterned surface layer, the optical element being operable to select at least one predetermined diffraction order produced by the interaction of the probe light with the multiple layers for delivery to the light detector.

30. The apparatus of claim 29, further comprising an aperture situated downstream of the optical element to select one or more particular diffraction orders of signal light for propagation to the light detector.

31. The apparatus of claim 30, wherein the aperture is a pinhole aperture.

32. The apparatus of claim 29, further comprising:
 a condenser lens situated downstream of the patterned surface layer so as to receive a selected order of diffracted signal light and condense the received signal light at a focal point; and
 an optical fiber having an entrance terminus located at the focal point so as to retrieve the selected diffraction order of signal light and deliver the retrieved signal light to the light detector.

* * * * *

UNITED STATES PATENT AND TRADEMARK OFFICE
CERTIFICATE OF CORRECTION

PATENT NO.    : 6,489,624 B1                                              Page 1 of 1
DATED         : December 3, 20002
INVENTOR(S)   : Ushio et al.

It is certified that error appears in the above-identified patent and that said Letters Patent is hereby corrected as shown below:

Column 20,
Line 31, "extend" should be -- extent --.
Line 43, "reached then" should be -- reached, then --.

Column 21,
Line 45, "polishing endpoint" should be -- polishing-endpoint --

Column 22,
Line 58, "(390 nm)" should be -- (390 nm). --.

Column 23,
Line 36, "reached then" should be -- reached, then --.

Column 24,
Lines 55-56, "and a reference spectrum of intensity." should be -- and a reference spectrum of intensity based on reflection or transmission from corresponding pattern features of a reference patterned layer. --.

Column 27,
Line 40, "light," should be -- light; --.

Signed and Sealed this

Sixth Day of January, 2004

JAMES E. ROGAN
*Director of the United States Patent and Trademark Office*